(12) United States Patent
Vrzic et al.

(10) Patent No.: US 10,778,779 B2
(45) Date of Patent: Sep. 15, 2020

(54) METHOD AND SYSTEM FOR SESSION MANAGEMENT FOR ULTRA RELIABLE AND LOW LATENCY COMMUNICATIONS IN HIGH MOBILITY SCENARIOS

(71) Applicants: Sophie Vrzic, Kanata (CA); Jaya Rao, Ottawa (CA)

(72) Inventors: Sophie Vrzic, Kanata (CA); Jaya Rao, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 335 days.

(21) Appl. No.: 15/621,523

(22) Filed: Jun. 13, 2017

(65) Prior Publication Data

US 2017/0366618 A1 Dec. 21, 2017

Related U.S. Application Data

(60) Provisional application No. 62/351,695, filed on Jun. 17, 2016, provisional application No. 62/358,413, (Continued)

(51) Int. Cl.
*H04L 29/08* (2006.01)
*H04W 8/06* (2009.01)
(Continued)

(52) U.S. Cl.
CPC .......... *H04L 67/14* (2013.01); *H04L 41/0654* (2013.01); *H04L 67/141* (2013.01);
(Continued)

(58) Field of Classification Search
CPC . H04L 41/0654; H04L 61/2514; H04L 67/14; H04L 67/141; H04L 67/148;
(Continued)

(56) References Cited

U.S. PATENT DOCUMENTS 8,400,911 B2 * 3/2013 Smith ................... H04L 69/28
370/225
2007/0189164 A1 8/2007 Smith et al.
(Continued)

FOREIGN PATENT DOCUMENTS

EP 1370041 A1 * 12/2003 ............ H04L 45/24
EP 1370041 A1 12/2003
(Continued)

OTHER PUBLICATIONS

3GPP TR23.799 v0.5.0 (May 2016), 3rd Generation Partnership Project; Technical Specification Group Services and System Aspects; Study on Architecture for Next Generation System (Release 14).*
(Continued)

*Primary Examiner* — Michael C Lai

(57) ABSTRACT

Embodiments provide for session continuity while a mobile device moves. In some embodiments the UE is served by a serving cluster including a plurality of ANs with redundant links, with each redundant link including a UPGW. This allows a session to be maintained (for example, the UE can maintain the same IP address) as it moves, even though the ANs (and the corresponding UPGWs may change as the UE moves). A session manager (SM) can be utilized to establish a session and configure UPGWs as needed. In some embodiments a branching point can be utilized. In some embodiments the SM configures the branching point.

16 Claims, 33 Drawing Sheets

Related U.S. Application Data filed on Jul. 5, 2016, provisional application No. 62/377,166, filed on Aug. 19, 2016, provisional application No. 62/402,620, filed on Sep. 30, 2016.

(51) Int. Cl.

| | |
|---|---|
| *H04W 36/00* | (2009.01) |
| *H04L 12/24* | (2006.01) |
| *H04W 8/18* | (2009.01) |
| *H04L 29/12* | (2006.01) |
| *H04L 29/06* | (2006.01) |
| *H04W 80/06* | (2009.01) |

(52) U.S. Cl.
CPC ............ *H04L 67/148* (2013.01); *H04W 8/06* (2013.01); *H04W 8/18* (2013.01); *H04W 36/0033* (2013.01); *H04L 61/2514* (2013.01); *H04L 69/14* (2013.01); *H04W 36/0038* (2013.01); *H04W 80/06* (2013.01)

(58) Field of Classification Search
CPC ............ H04L 69/14; H04W 36/0033; H04W 36/0038; H04W 76/11; H04W 76/12; H04W 80/06; H04W 8/06; H04W 8/18
USPC ........................................................ 709/228
See application file for complete search history.

(56) References Cited

U.S. PATENT DOCUMENTS

| | | | | |
|---|---|---|---|---|
| 2009/0111458 | A1* | 4/2009 | Fox ................ | H04W 84/042 |
| | | | | 455/422.1 |
| 2013/0013957 | A1* | 1/2013 | Armstrong ........... | H05K 7/1445 |
| | | | | 714/4.12 |

FOREIGN PATENT DOCUMENTS

| | | | | |
|---|---|---|---|---|
| EP | 1919136 A1 * | 5/2008 | ............ | H04B 7/026 |
| WO | 2007039757 A2 | 4/2007 | | |

OTHER PUBLICATIONS

International Search Report dated Aug. 17, 2017 for corresponding International Application No. PCT/CN2017/088838 filed Jun. 16, 2017.

3GPP 3GPP TR 23.799 V0.5.0 3rd Generation Partnership Project; Technical Specification Group Services and System Aspects; Study on Architecture for Next Generation System (Release 14) Jun. 8, 2016.

Nokia et al. 3GPP SA WG2 Meeting #115 S2-162507 New Solution; Session Management to Enable (Re-)selection of Efficient User plane path May 17, 2016.

Huawei et al. 3GPP TSG-RAN2 Meeting 394 R2-164130 Support for ultra-reliable low latency communication (URLLC) May 13, 2016.

* cited by examiner

US 10,778,779 B2

METHOD AND SYSTEM FOR SESSION MANAGEMENT FOR ULTRA RELIABLE AND LOW LATENCY COMMUNICATIONS IN HIGH MOBILITY SCENARIOS

CROSS-REFERENCE TO RELATED APPLICATIONS

This disclosure relates to U.S. provisional patent application Ser. 62/351,695 filed Jun. 17, 2016, Ser. 62/358,413 filed Jul. 5, 2016, Ser. 62/377,166 filed Aug. 19, 2016 and Ser. 62/402,620 filed Sep. 30, 2016 all titled "METHOD AND SYSTEM FOR SESSION MANAGEMENT FOR ULTRA RELIABLE AND LOW LATENCY COMMUNICATIONS IN HIGH MOBILITY SCENARIOS" the disclosures of which are hereby incorporated by reference in its entirety.

FIELD OF THE INVENTION

The present invention pertains to the field of communications networks, and in particular to a system and method for providing reliable data transmissions with mobility.

BACKGROUND

Networks are typically built with the recognition that not all users will require service at any given point, and therefore are not engineered to do so. Accordingly, networks may have limited resources to service all customer demands over existing infrastructure. Therefore, networks cannot provide full service to all users at the same time. However, sometimes ultra reliable low latency communication (URLLC) is required, for example for mission critical communication services such as may be required in the case of a medical or other emergency.

Current technologies can only partially support URLLC services due to insufficient bandwidth and lack of support for high mobility along with a consistent and low level of latency. Accordingly, there is a need for improved networking services which can provide sufficient bandwidth and coverage, as well as support for high mobility, to provide high throughput, low latency communication services for critical communications.

Accordingly, there is a need for a system and method that at least partially addresses one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

Embodiments provide for session continuity while a mobile device moves. Embodiments provide session management and (re)selection of efficient user plane paths for Ultra Reliable Low Latency Communication (URLLC). In some embodiments the UE is served by a serving cluster including a plurality of ANs with redundant links, with each redundant link including a UPGW. This allows a session to be maintained (for example, the UE can maintain the same IP address) as it moves, even though the ANs (and the corresponding UPGWs may change as the UE moves).

Embodiments provide for session continuity for a network architecture which utilizes a branching point for multi-homed sessions interspersed between a RAN (which may utilize one or more serving ANs) and multiple UPGWS.

An aspect of the disclosure provides a method of managing a session for a User Equipment (UE) by a session management (SM) network function. Such a method includes receiving a request to establish a session requiring multiple redundant paths and establishing the session for the UE using a user plane gateway (UPGW) for each multiple redundant path, at least one first UPGW being associated with a first local data network. In some embodiments at least one UPGW is associated with a local data network close to an access node capable of serving the UE. In some embodiments a second UPGW is associated with a second local data network. In some embodiments the first UPGW is associated with a primary destination address. In some embodiments the second UPGW uses network address translation for forwarding packets associated with the session. In some embodiments the second UPGW is directly connected to a local data network and packets associated with the session are forwarded by the second UPGW without network address translation. In some embodiments the method further includes receiving a session update message; and modifying the session in response to the session update message. In some embodiments modifying comprises adding a new UPGW to the session. In some embodiments modifying further includes removing a UPGW from the session. In some embodiments the method further includes updating network address translation information in response to the modifying. In some embodiments the local data networks include mobile edge computing servers. In some embodiments the first UPGW is associated with an application server connected to a data network and a second UPGW is associated with local data network. In some such embodiments the request is for a multi-homed packet data unit (PDU) session associated with a user equipment (UE) to access both a local service hosted in the local data network and an application server via the internet. In some embodiments the first UPGW is associated with a primary address and multiple secondary UPGWs perform network address translation. In some embodiments the request includes Quality of Service (QoS) requirements, and the method further includes the SM initiating a policy procedure. In some embodiments which utilize network address translation, a local data network may not be utilized, with both UPGWs providing redundant paths to an application server.

Another aspect of the disclosure provides a method of transmitting data packets for a packet data unit (PDU) session associated with a user equipment (UE). Such a method is performed by a user plane branching function and includes receiving data packets associated with the PDU session from an access network and forwarding the data packets to a first user plane gateway (UPGW). A user plane branching function is also referred to a branching point. The method further includes duplicating the data packets and forwarding the duplicated data packets to a second UPGW. In some embodiments the method further includes receiving packets from the first UPGW, receiving packets from the second UPGW, merging the packets and forwarding the packets towards the UE via the access network. In some embodiments merging includes removing duplicate packets. In some embodiments the user plane branching function is configured with filtering rules for performing the packet duplication, packet forwarding and packet merging. In some embodiments the filtering rules include filtering criteria other than the source IP address. In some embodiments the filtering rules include criteria for network address translation. In some embodiments the method further includes performing network address translation to determine the address of the second UPGW. In some embodiments the user plane branching function is configured to enforce access point name aggregate maximum bit-rate (APN AMBR) and charging.

Another aspect of the disclosure provides a method of managing a session for a User Equipment (UE) by a session management (SM) network function. Such a method includes receiving a request to establish a session requiring multiple redundant paths from the UE via an access network. The method further includes establishing the session for each of the multiple redundant paths using a user plane gateway (UPGW) for each multiple redundant path and a user plane branching function between the access network and the UPGWs. In some embodiments establishing the session includes performing session setup between the AN and the user plane branching function; and performing session setup between the user plane branching function and each UPGW. In some embodiments the session is established using at least one secondary UPGW. In some embodiments the method further includes configuring the user plane branching function to perform network address translation to forward packets to the at least one secondary UPGW. In some embodiments the method further includes configuring the user plane branching function with filtering criteria for forwarding data between the AN and the UPGWs. In some embodiments the user plane branching function is configured with filtering criteria for performing packet duplication, packet forwarding and packet merging. In some embodiments the filtering criteria include filtering criteria other than the source IP address. In some embodiments the filtering criteria include criteria for network address translation. In some embodiments the method further includes configuring the user plane branching function to receive data packets associated with the session from an access network; forward the data packets to the first user plane gateway (UPGW); duplicate the data packets; and forward the duplicated data packets to the at least one second UPGW. In some embodiments the method further includes configuring the user plane branching function to receive packets from the first UPGW; receive packets from the second UPGW; merge the packets; and forward the packets towards the UE via the access network. In some embodiments the method further includes receiving a session update message; and modifying the session in response to the session update message. In some embodiments modifying includes adding and removing a UPGW; and adding and removing a use plane branching function.

Another aspect of the disclosure provides method of transmitting data packets for a packet data unit (PDU) session associated with a user equipment (UE), the method performed by a user plane branching function. Such a method includes receiving uplink data packets associated with the PDU session from a first access node (AN) and a second access node. The method also includes removing duplicate packets and forwarding the packets to a user plane gateway (UPGW) for forwarding the packets to an application server. In some embodiments also include receiving downlink data packets associated with the PDU session from the UPGW; duplicating the data packets; and forwarding the duplicate packets to each of the first AN and the second AN.

Other aspects of the disclosure provide for network elements configured to perform the methods described herein. For example, network elements can be configured as a SM or a user plane branching function. For example network elements can include a processor, and machine readable memory storing machine readable instructions which when executed the processor, cause the network element to perform the methods described herein.

BRIEF DESCRIPTION OF THE FIGURES

Further features and advantages of the present invention will become apparent from the following detailed description, taken in combination with the appended drawings, in which.

DETAILED DESCRIPTION OF EMBODIMENTS

Figure 1A:
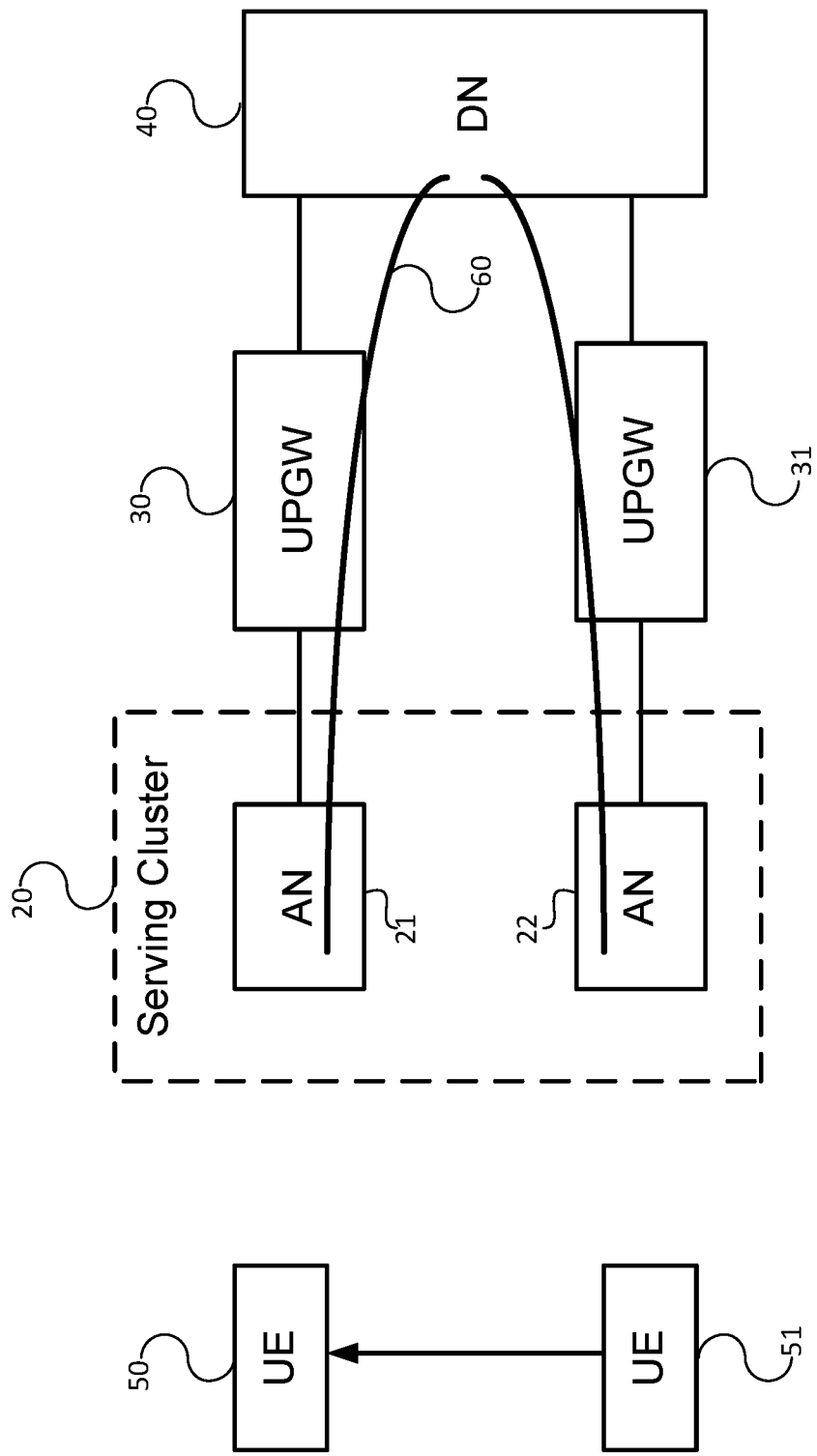
FIG. 1A illustrates a first scenario, according to an embodiment.

To support session management and continuity with i) ultra high reliability and low latency (URLL) requirements and ii) in high mobility scenarios, embodiments are discussed which satisfy one or more of the following:

a. Perform seamless handover: The user equipment (UE) is assumed to be always connected to the network and incurs minimal or no interruption time associated with handover from one access node to another.

b. Utilize redundant transmission paths/links: Ultra high reliability is achieved over both access and non-access communication segments by utilizing multiple paths/links. On the access segment redundant links are provided via multiple access nodes and/or multiple Radio Access Technologies (RATs). Likewise on the non-access segment (also called the core network), multiple routing paths are used between the access nodes and an application server (AS).

c. Including AS functionality close to the Access Network (AN), for example by utilizing Mobile Edge Computing (MEC): A MEC server provides application level processing close to the AN. As a terminating application function, MEC enables ultra low round-trip time (RTT) between the UE and the MEC server.

To facilitate uplink/downlink (UL/DL) transmissions, a URLL session is established between the UE and the Application Server (AS)/MEC via the access nodes in the Radio Access Network (RAN) and the user-plane (UP) gateway (UPGW) in the Core Network (CN). The UPGW provides the joint functionality of an IP anchor and mobility anchor.

As the UE is mobile, the established URLL session can be maintained throughout the session lifetime by changing the transmission paths via different ANs and UPGWs if and as necessary.

In order to support ultra reliable low latency communication, embodiments establish user-plane gateways (UPGWs), which provide mobility and IP anchoring, close to the UE, in terms of the topology of the network. In some URLLC use cases, Application Server (AS) functionality can be located close to the RAN in order to allow applications to run closer to the edge. The UPGW and/or the MEC server can be collocated with the AN node or close enough to the AN node to satisfy the RTT requirements.

Although using a local UPGW can reduce the end-to-end latency, a single UPGW close to the RAN access nodes cannot always meet ultra low latency (ULL) requirements in high mobility scenarios and/or in ultra-dense network deployments, depending on the amount of time it takes for a UE to detach from serving a single UPGW and re-attach to another UPGW as it moves out of coverage. Therefore, embodiments provide seamless handover of the UPGW is required to support URLLC with high mobility.

In order to satisfy the reliability requirement, redundant links can be used. In this case, the UE can have multiple serving ANs/TRPs and multiple UPGWs to handle the redundant traffic. An AN can include an access point, such as a base station, eNodeB or other technologies which provide transmit and receive point (TRP), such as a base band unit (BBU) coupled to remote radio heads (RRHs). The multiple AN nodes can transmit the same data to the UE at the same time using SFN (Single Frequency Network) transmission. The serving cluster is updated as the UE moves. An AN node is added to the serving cluster as the UE moves within coverage of the AN node. When the UE moves out of coverage of an AN node then the AN node is removed from the serving cluster. The AN nodes can be connected to different UPGWs to satisfy the ULL requirements and to ensure the reliability requirement is satisfied. The redundant paths can eliminate the handover interruption time and are robust to link failures.

Figure 1B:
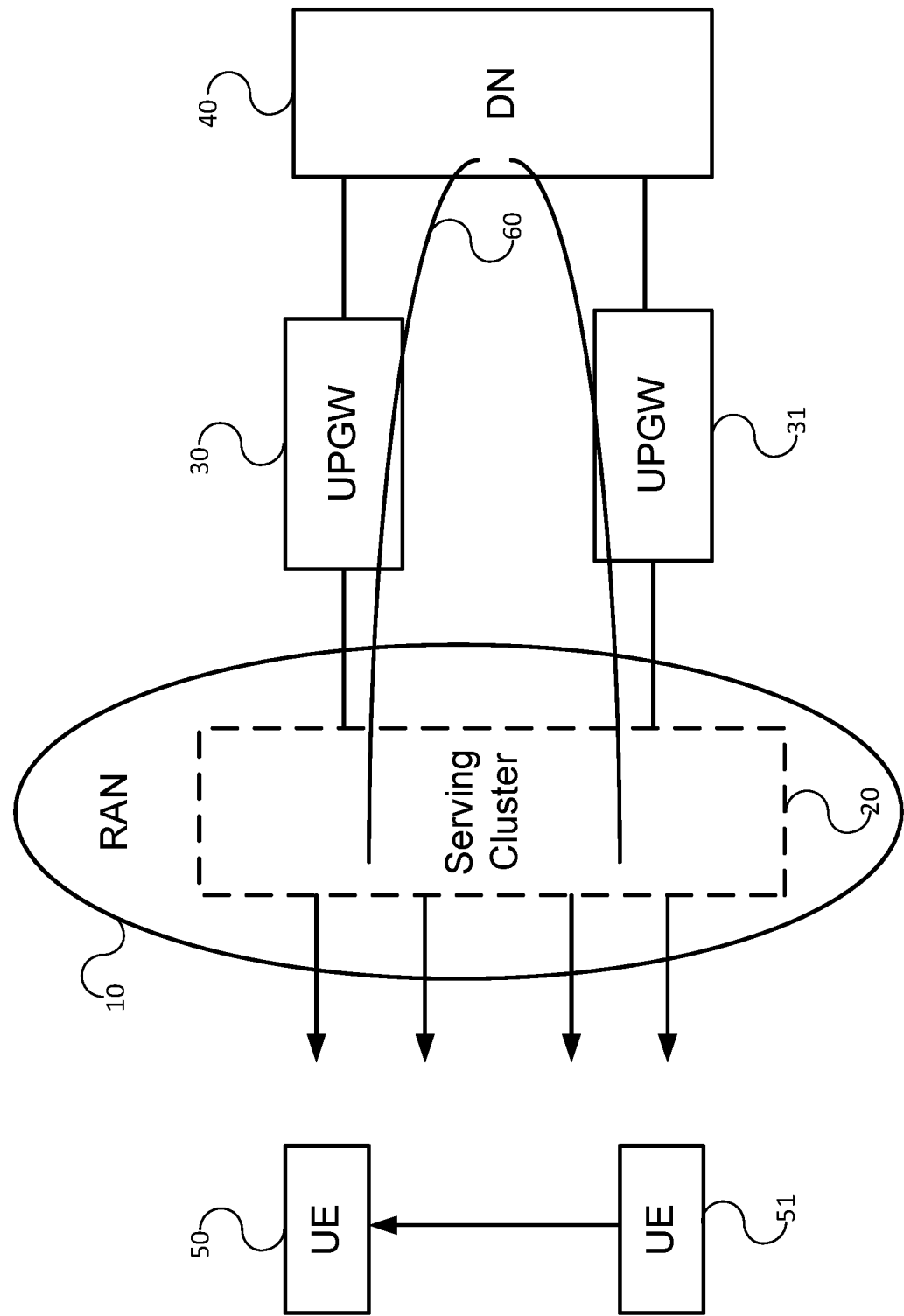
FIG. 1B illustrates a different view of the first scenario, according to an embodiment.
Figure 7:
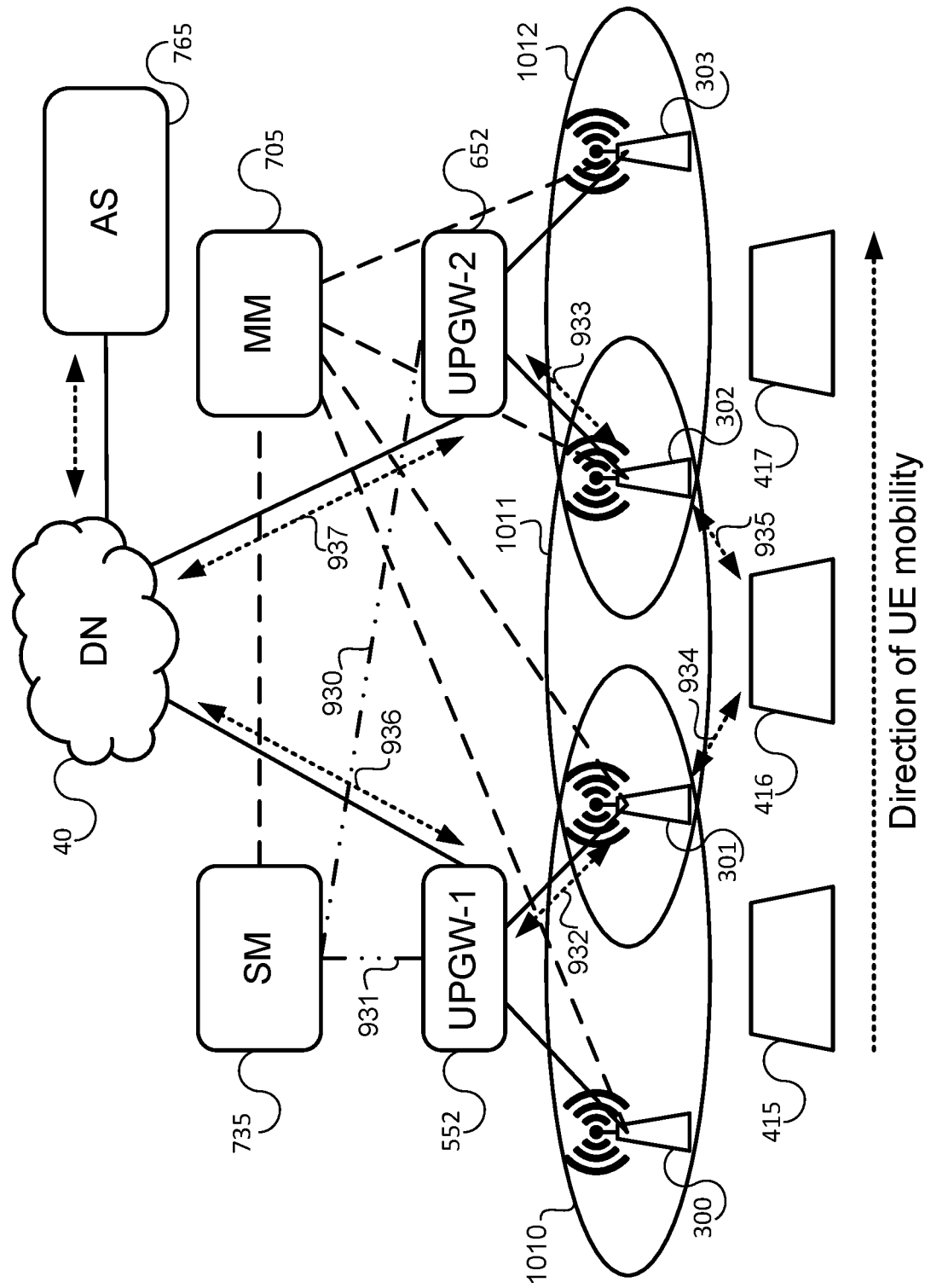
FIG. 7 is an alternative view for scenario 1 which adds more details, according to an embodiment.

Embodiments will be discussed relating to two scenarios. In the first scenario, there is only one DN and each UPGW forwards the URLLC packets to the same AS in a data network (DN). FIG. 1A illustrates such a scenario, according to an embodiment. In this case, there is one destination address for the AS in the DN with multiple redundant paths from the UE 50 and 51 to the DN 40. In the example illustrated in FIG. 1A, a UE 50 and 51 is served by a serving cluster 20, which in this case includes two ANs 21 and 22, but more could be included. FIG. 1B illustrates a different view of the first scenario, according to an embodiment, generalizing the serving cluster 20 to the RAN 10. A UPGW 30 or 31 is associated with one or more AN, providing redundant links enabling redundant data flows of packets between the UE 50 and 51 and the DN 40. In some embodiments the SM NF informs the AS of the IP address of the multiple UPGWs during the session establishment/update procedure. For DL packets, the AS sends the same packet to multiple UPGWs and then to the UE. FIG. 7 is an alternative view for scenario 1A which adds more details, according to an embodiment. In FIG. 7, dotted lines represent the UP transmission paths used in the URLL session, the solid lines represent the available UP transmission paths and the dashed lines represent control plane (CP) links (for signaling). The lines that are a combination of dashed and dotted lines (930 and 931) represent CP links for signalling as well as UP transmission paths. It should be appreciated that the embodiment of FIG. 7 can be generalized to have a serving cluster with more than two ANs (300, 301, 302, and 303) as per FIG. 1B. As UE moves, its serving cluster can change. For example, in FIG. 7 several serving clusters (1010, 1011, 1012) are shown to illustrate the ANs which comprise the serving cluster change. For example, at position 415 the serving cluster 1010 includes ANs 300 and 301. At position 416 the serving cluster 1011 includes ANs 301 and 302. At position 417 the serving cluster 1012 includes ANs 302 and 303. ANs. ANs. ANs can include access points, base stations or Remote Radio Heads (RRHs) with associated baseband units). These different serving clusters provide paths to the DN through different UPGWs. When the UE is connected to more than one AN, it has multiple redundant paths to the DN. FIG. 7 shows UE at position 416 connected to DN 41 through two redundant paths. UE 416 is connected to AN301 via user plane path 934 and AN302 via user plane path 935. AN301 is then connected to UPGW-1 552 via user plane path 932 and UPGW-1 552 to DN 41 via user plane path 936. AN302 is connected to UPGW-2 652 via user plane path 933 and UPGW-2 652 to DN 41 via user plane path 937.

Figure 2A:
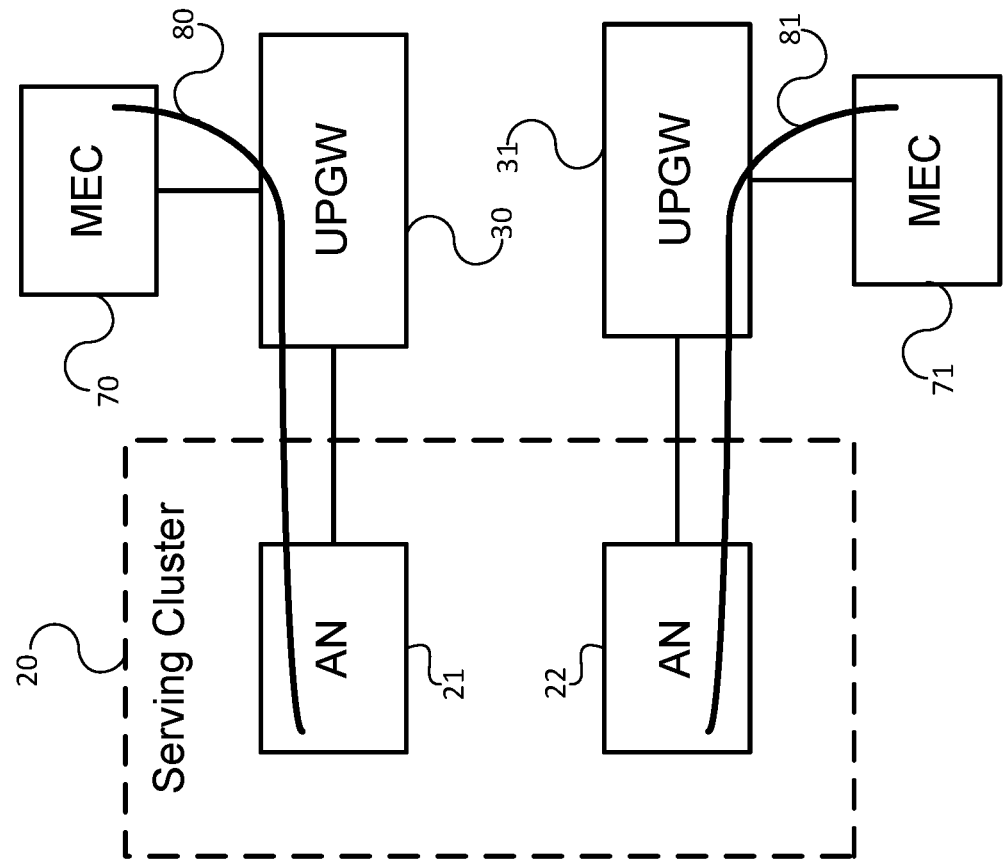
FIG. 2A illustrates a second scenario, according to an embodiment.
Figure 2A:
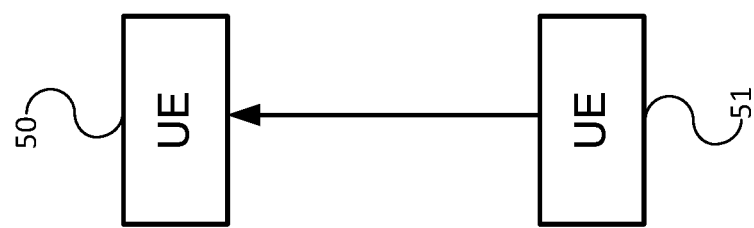
Figure 2B:
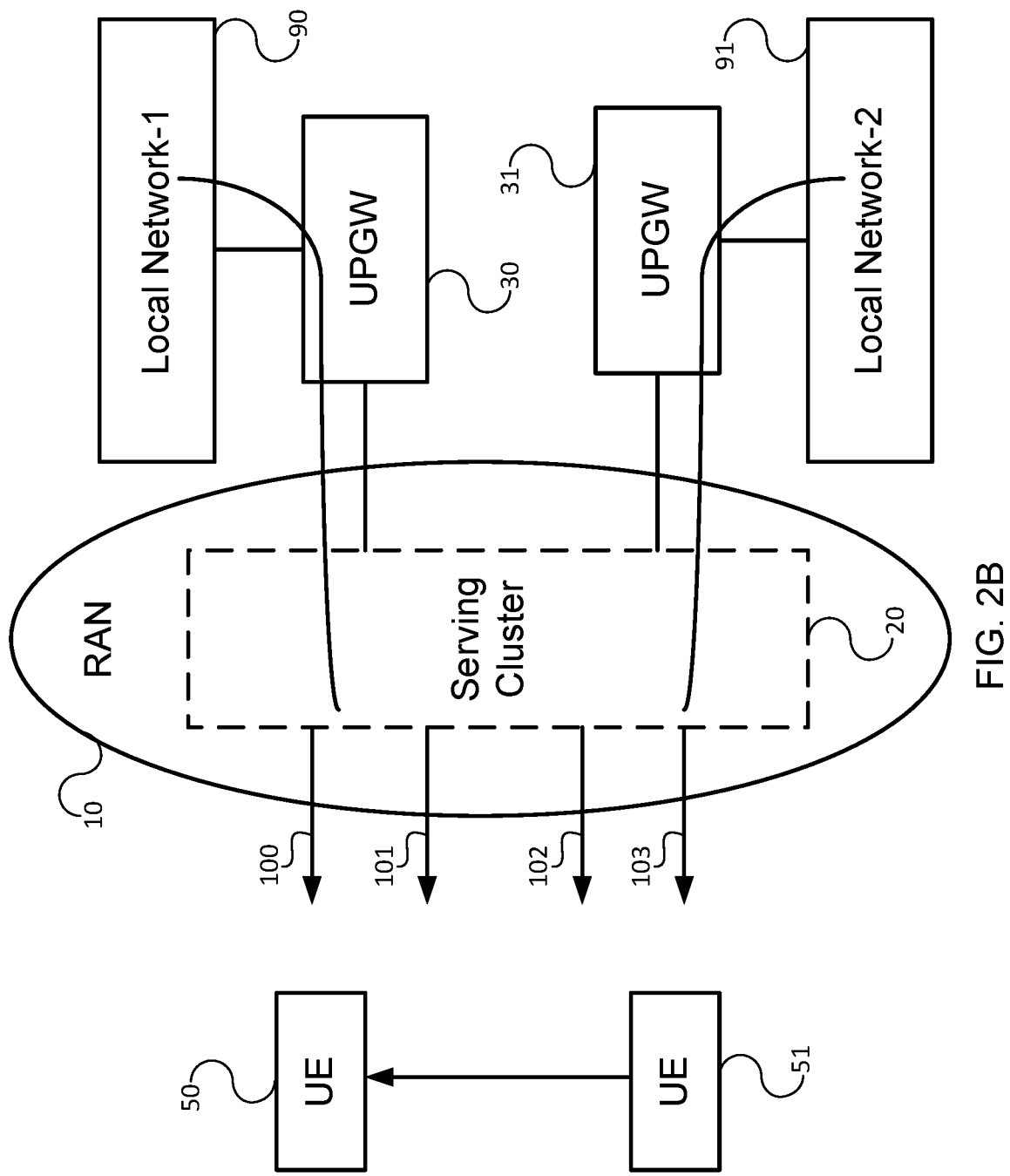
FIG. 2B illustrates a different view of the second scenario, according to an embodiment.
Figure 2C:
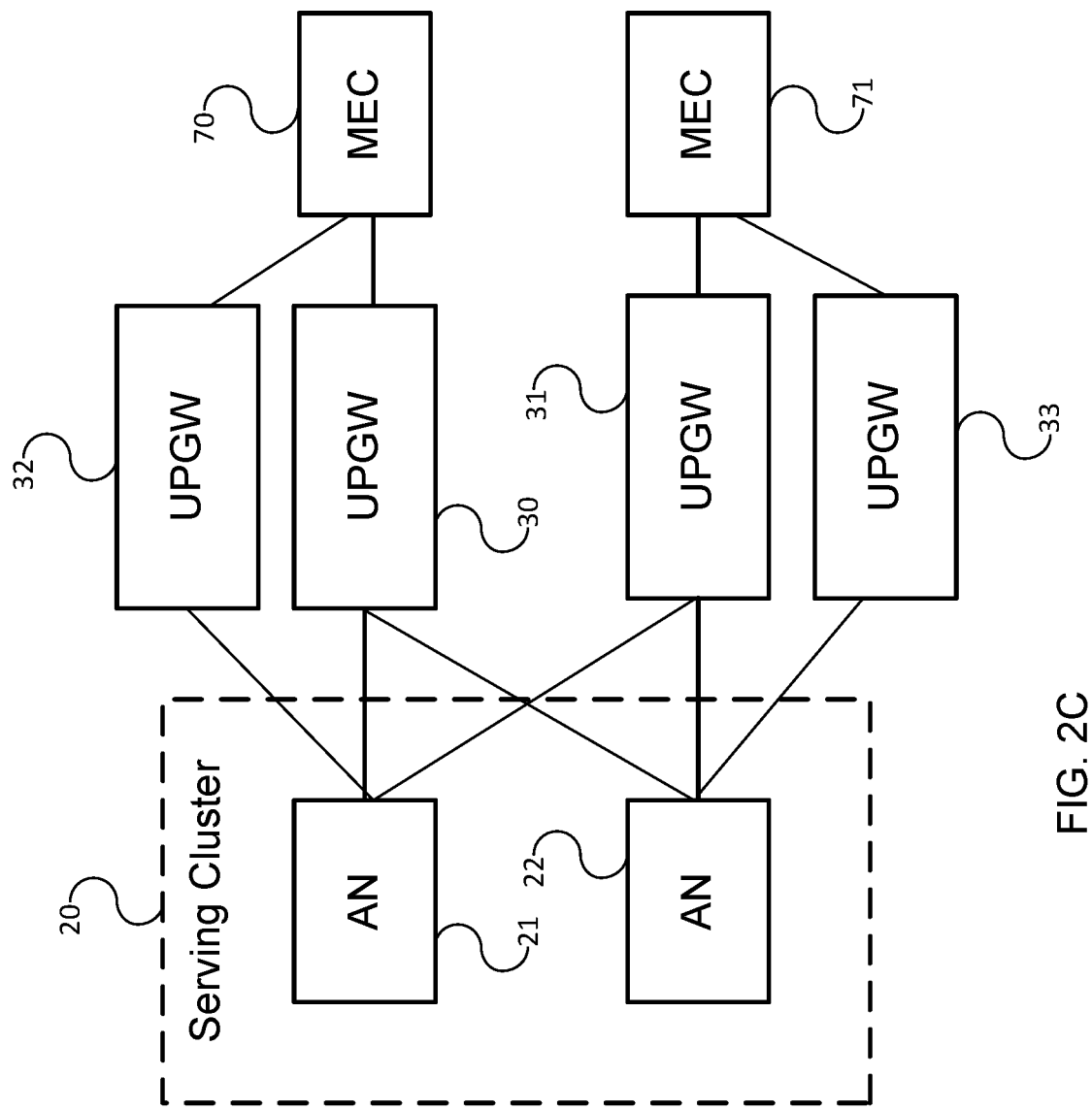
FIG. 2C illustrates a more generalized scenario, according to an embodiment.
Figure 2C:
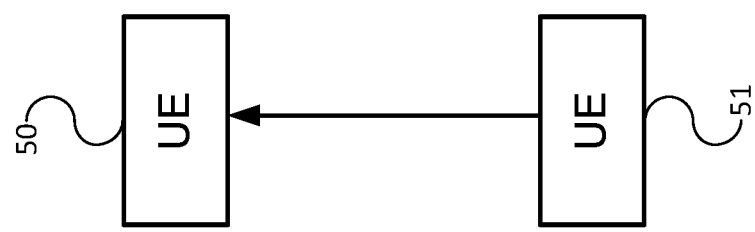
Figure 8:
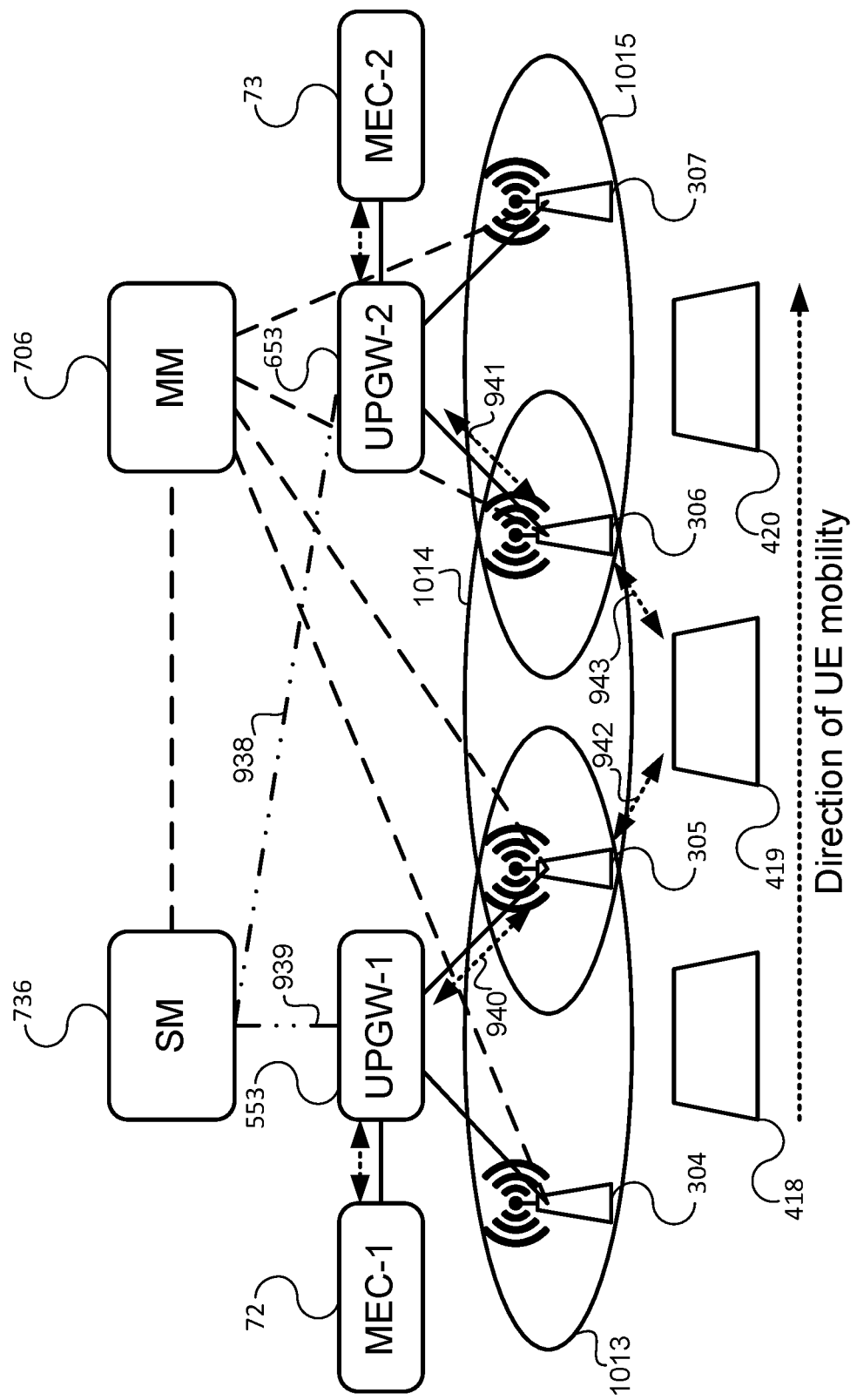
FIG. 8 is an alternative view for scenario 2 which adds more details, according to an embodiment.

In some embodiments AS functionality is added close to the RAN. Examples are shown in FIG. 2, according to some embodiments. FIG. 2A illustrates a second scenario, according to an embodiment. In FIG. 2A, as in FIG. 1A, each link from an AN 21 and 22 of the serving cluster 20 includes an UPGW 30 and 31, with 2 being shown by way of example only. In general, there can be multiple ANs 21 and 22 associated with one UPGW 30 or 31. FIG. 2A also includes multiple local UPGWs each connected to a local data network 70 or 71 (similar to a local breakout in LTE). In the embodiment shown in FIG. 2A the local data network includes a MEC server, with each link traversing between the AN 21 or 22 and a MEC server 70 or 71 respectively, via a UPGW 30 or 31. However it should be noted that a MEC server is just an example of including AS functionality close to the RAN. In this case, there are multiple destination addresses to different local DNs/MEC servers. One destination address can be used as the primary destination address. This address is used by the UE 50 and 51 for UL transmission. For the other destination addresses, the corresponding UPGW 30 or 31 can implement a NAT to modify the address to the associated local DNs/MECservers 70 and 71. FIG. 8 is an alternative view for scenario 2 which adds more details, according to an embodiment. In FIG. 8, once again dotted lines represent the UP transmission paths used in the URLL session, the solid lines represent the available UP transmission paths and the dashed lines represent control plane (CP) links (for signaling). The lines that are a combination of dashed and dotted lines (938 and 939) are both CP links for signalling as well as UP transmission paths. As UE moves its serving cluster can change. For example, in FIG. 8—several serving clusters (1013, 1014, 1015) are shown to illustrate the ANs which comprise the serving cluster change. For example, at position 418 the serving cluster 1013 includes ANs 304 and 305. At position 419 the serving cluster 1014 includes ANs 305 and 307. At position 420 the serving cluster 1015 includes ANs 306 and 307. ANs can include access points, base stations or Remote Radio Heads with associated baseband units. These different serving clusters provide paths to the DN through different UPGWs. When the UE is connected to more than one AN, it has multiple redundant paths to the DN. FIG. 8 shows UE 419 connected through two redundant paths. UE 419 is connected to AN305 via 942 and AN306 via 943. AN305 is then connected to UPGW-1 553 via 940. AN306 is connected to UPGW-2 653 via 941. FIG. 2B illustrates a more general view of the first scenario, according to an embodiment. Two generalizations are made in FIG. 2B. First, FIG. 2B shows generalizes the serving cluster 20 to a RAN 10 and also clarifies the scenario is not limited to 2 APs, and additional APs (connected via 100, 101, 102, and 103) can be included. Second, FIG. 2B generalizes that that there are multiple local networks 90 and 91 which can include AS functionality, but clarifies that embodiments are not limited to MEC servers. In some embodiments, there are multiple destination addresses to different ASs in local networks. One destination address of one AS is used by the UE as the primary destination address for UL transmission. For the other destination addresses, the corresponding UPGW can implement a NAT to modify the destination address of UL packet to the associated local AS. In some embodiments the AS/UE can support URLLC sessions by sending/receiving multicasting packets to/from multiple paths. It should be appreciated that the embodiment of FIG. 8 can be generalized as per FIG. 2B. To further generalize, each AN node can send duplicate packets to multiple UPGW, which are connected to the same local data network (MEC server). The AN node 21 and 22 can also send duplicate packets to UPGWs 30, 31, 32, 33 that are connected to another local data network (MEC server 70 and 71). This scenario is illustrated in FIG. 2C.

For satisfying URLL requirements, the UPGW can be located close to the AN nodes. In scenario 1, multiple redundant links allow the UPGW to provide local breakout functionality to the external data network (DN) at which the AS is located. Similarly, in scenario 2 as there are multiple MEC servers, there are multiple redundant links with each link traversing between an AN and a MEC server, which can be accessed via the UPGW located close to the network edge or co-located with the ANs. In some embodiments, scenarios 1 and 2 can be combined.

The described architectures illustrated in FIGS. 7 and 8 assume the use of the session manager (SM) in the control plane (CP) of the CN whose functionality is to establish the URLL session and selection of the UPGW. Additionally, the mobility manager (MM) in the CP performs UE location discovery and establishes the UE centric cluster composed of multiple ANs which are continuously adapted based on the UE mobility attributes.

Figure 3:
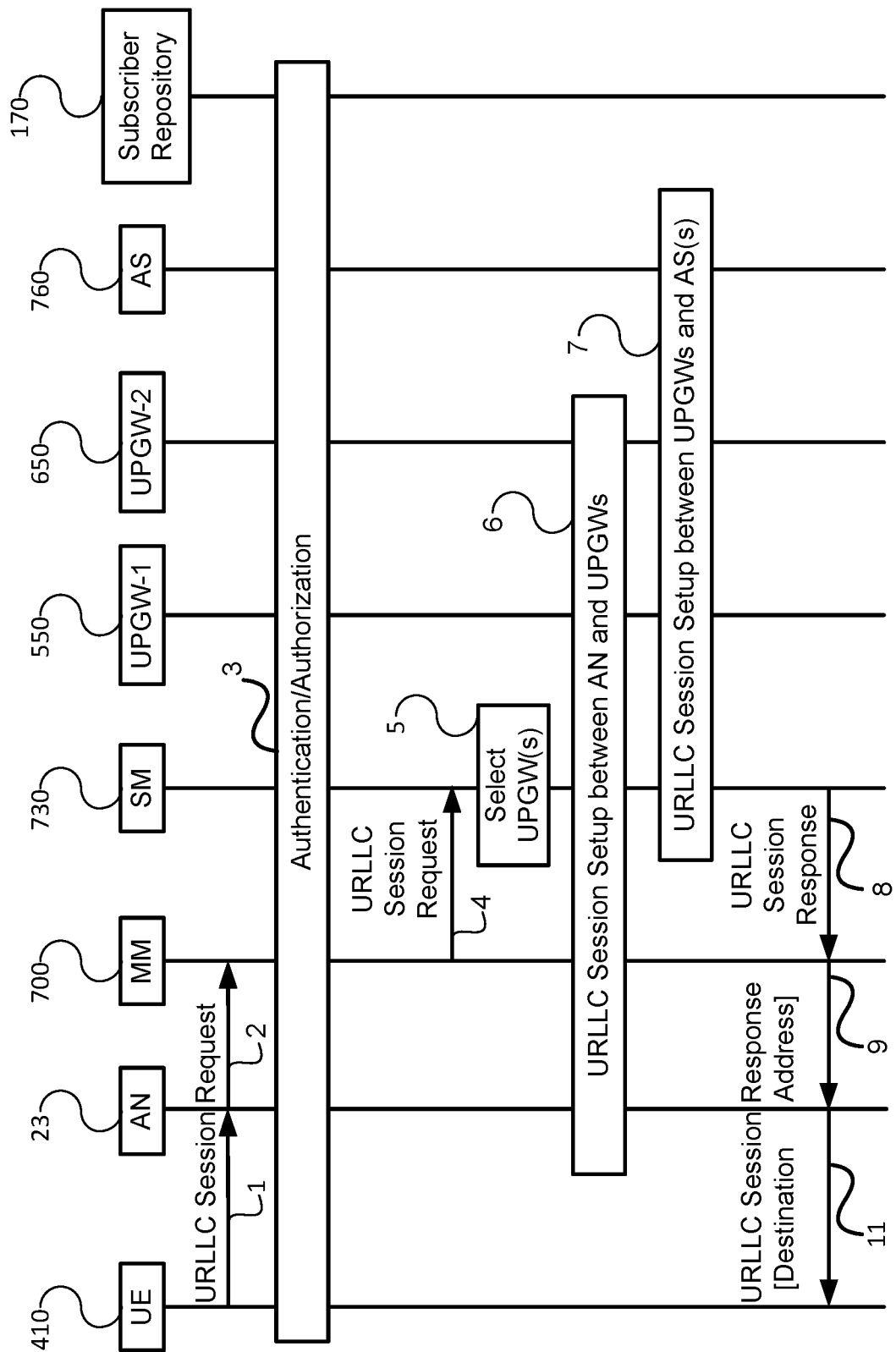
FIG. 3 illustrates an URLLC session request procedure, according to an embodiment.

FIG. 3 illustrates a URLLC session request procedure, according to an embodiment, which can be used for both scenarios. At Step 1, the UE 410 sends a URLLC Session Request 1. The request is received by multiple ANs 23 (or TRP points). Each AN 23 forwards the request 2 to a mobility management (MM 700) network function (NF). At Step 2, the MM network function initiates the authentication/authorization (AU) procedure by sending the request 3 to the AU NF, which checks the subscriber repository 170. At Step 3, the MM 700 NF sends the URLLC Session Request 4 to the session management (SM 730) NF. At Step 4, the SM 730 NF may select multiple UPGWs 5 for the UE, based on such factors a location of UE, UE's serving cluster, PDU connectivity requirement (e.g. URLLC), network topology, capacity, loading, policy, data network name, latency requirement etc. The number of UPGWs selected for a URLLC session depends on the reliability requirement and on the probability of link failure. It also depends on the latency requirement and on the size (geographic coverage area) of the serving cluster. The UPGWs 550 and 650 should be close enough to meet the ULL requirement. If the serving cluster is large and the latency requirement is low then more UPGWs are needed. At Step 5, the SM 730 determines the UP paths 6 between the serving ANs 23 and the selected UPGWs 550 and 650. At Step 6, the SM 730 establishes the URLLC session 7 between UPGWs 550 and 650 and AS 760, for example by informing the AS(s) of the IP addresses of the selected UPGWs. The traffic routing between the AS 760 and the UPGWs 550 and 650 may be based on L2 forwarding, IP tunnel, etc. At Step 7, the SM 730 sends a URLLC Session Response 8 to the MM 700. For the second scenario, the SM should decide the primary destination address for the session and include it in the URLLC session response 8. At Step 8, the MM 700 sends a URLLC Session Response 9 to the serving ANs 23. The serving ANs 23 forward the response 11 to the UE 410.

In some embodiments, some or all of the NFs can be virtual functions instantiated on an as needed basis. In some embodiments the MM and SM NFs can be combined.

After the URLLC session is setup, the UE can send UL data to the serving cluster using the destination address of the AS. In the second scenario, the UE uses the primary destination address that was assigned during the URLLC session setup procedure. The ANs/TRPs forward the UL data to the corresponding UPGW. If there is one DN then each UPGW forwards the packet to the AS. Otherwise, if there are multiple local DNs then the UPGW for the primary link forwards the packet using the destination address. The UPGW for the secondary link uses a NAT to update the destination address to the address of the secondary AS.

Figure 4:
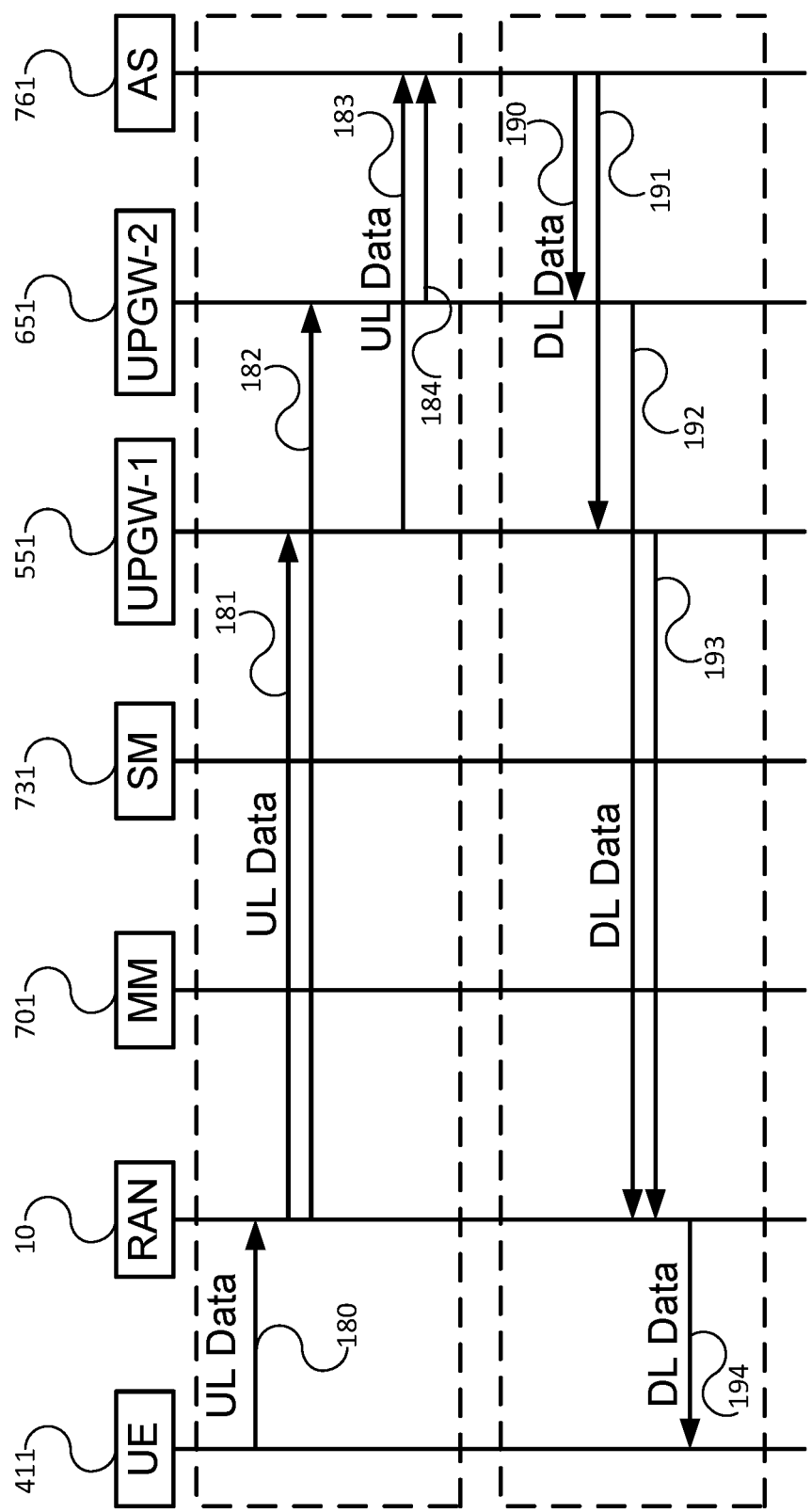
FIG. 4 illustrates the UL and DL UP paths, according to an embodiment.

FIG. 4 illustrates the UL and DL UP paths, according to an embodiment. In FIG. 4, the UE 411 transmits (UL 180) to the RAN 10. It should be appreciated that the UE 411 is preferably served my multiple ANs within the RAN. UL data 181 is sent to UPGW-1 551. UL data 182 is sent to UPGW-2 651. UL data 183 and 184 is transmitted to the AS 761 for each redundant link (two of which are shown, with each redundant link associated with a UPGW-2 651). For the UL, in some embodiments the AS 761 uses selection combining to process the data received from the redundant links. For the DL, in some embodiments the AS 761 sends the same data to multiple destinations (or it sends it to some function that can forward to multiple destinations). Accordingly DL data 190 and 191 from the AS 761 is buffered at each UPGW 551 and 651 before being transmitted 194 to the UE 411 via the RAN 10.

Since it is desirable to have the UPGW 551 and 651 located close to or co-located with the serving ANs, some embodiments are configured to perform frequent reselection of the UPGWs when the UE 411 is mobile. This involves the transmission paths between the AS/MEC server to be detached and attached every time a new UPGW is used.

The problem is further exacerbated in ultra-density network (UDN) deployments where the number of ANs and consequently, the number of AN-UPGW attachment points are prohibitively high.

As such, there is a need for solutions to enable seamless session continuity via multiple UPGWs that satisfies the URLL requirements and with minimal complexity and signalling overhead.

Accordingly, embodiments provide for session continuity while the mobile device moves. In some embodiments the UE is served by a serving cluster including a plurality of ANs with redundant links, with each redundant link including a UPGW. This allows a session to be maintained (for example, the UE can maintain the same IP address) as it moves, even though the ANs (and the corresponding UPGWs may change as the UE moves).

Therefore according to some embodiments, when the UE moves toward the coverage area of another AN/TRP that is connected to a new UPGW, the SM NF selects the new UPGW and setups the UP path between the serving cluster and the new UPGW. The SM also initiates the session establishment procedure between the UPGWs and the AS(s). If the UE moves out of coverage of the TRPs that are associated with a given UPGW then the UE's association with that UPGW can be removed.

Figure 5A:
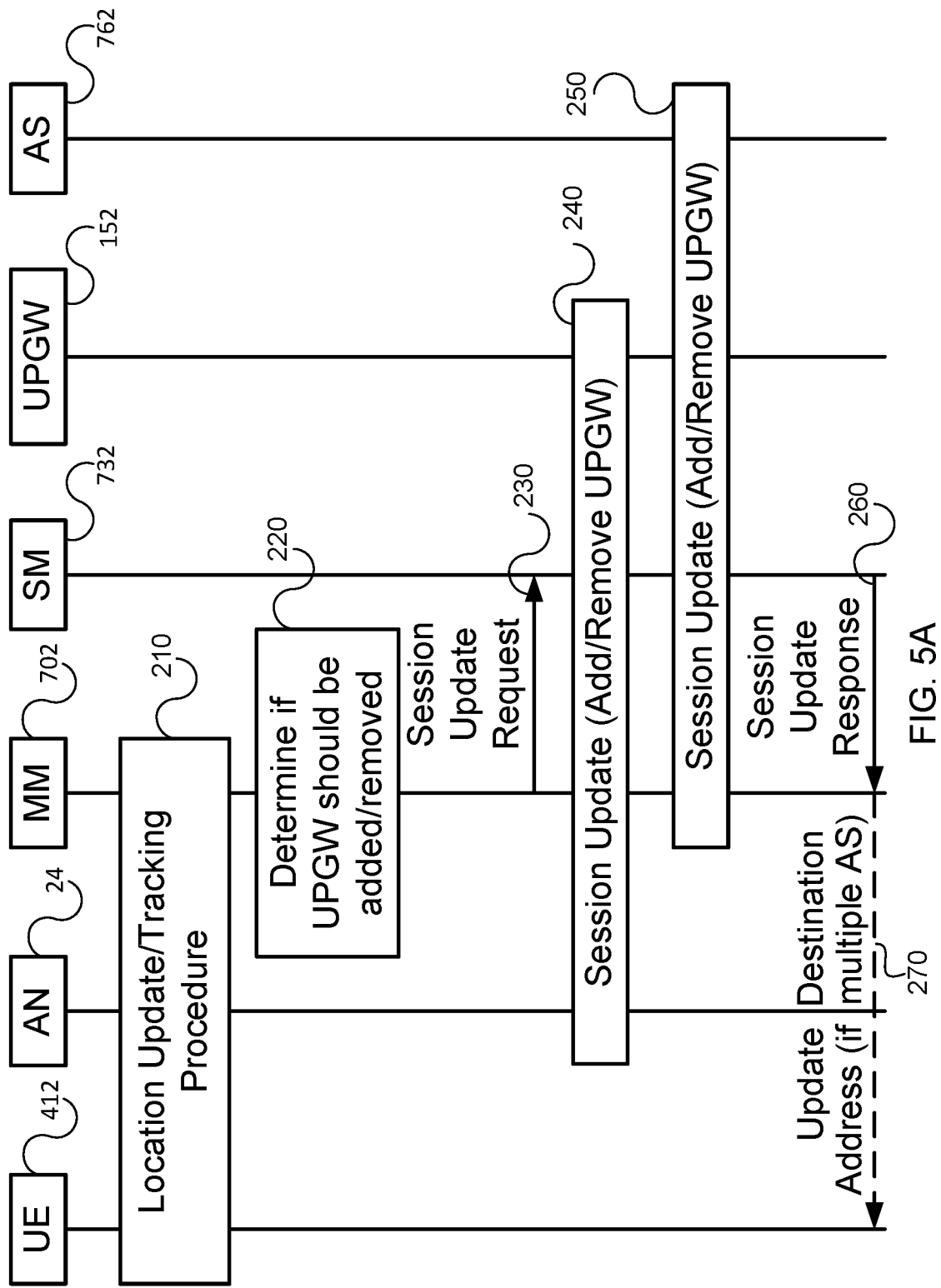
FIG. 5A illustrates an example URLLC session update procedure for adding or removing UPGWs and associated links, according to an embodiment.

FIG. 5A illustrates an example URLLC session update procedure for adding or removing UPGWs and associate links, according to an embodiment. At Step 10, the location update or location tracking procedure 210 is performed. This procedure involves the UE 412, the ANs 24 and the MM 702 NF. At Step 20, 220, the MM 702 determines if a new UPGW 152 should be added or removed for the UE 412 based on such factors as the location information, which includes the ANs/TRPs in the UE's serving cluster and if new ANs/TRPs have been added or removed to the UE's serving cluster. At Step 30, the MM 702 sends a Session Update Request 230 to the SM 732. At Step 40, the SM 732 establishes a new session 240 if a new UPGW 152 is added. Otherwise, it terminates a session if a UPGW is removed. At Step 50, the SM 732 updates the URLLC session 250 between the UPGW(s) 152 and the AS 762. If each UPGW 152 has a breakout to a local network then the session is updated between each UPGW and the corresponding AS in the local network. At Step 60, the SM 732 sends a Session Update Response 260 to the MM 702. If there are multiple local DNs, at Step 70, the MM 702 sends an Update Destination Address 270 to the UE 412 if the primary destination address has changed.

Figure 5B:
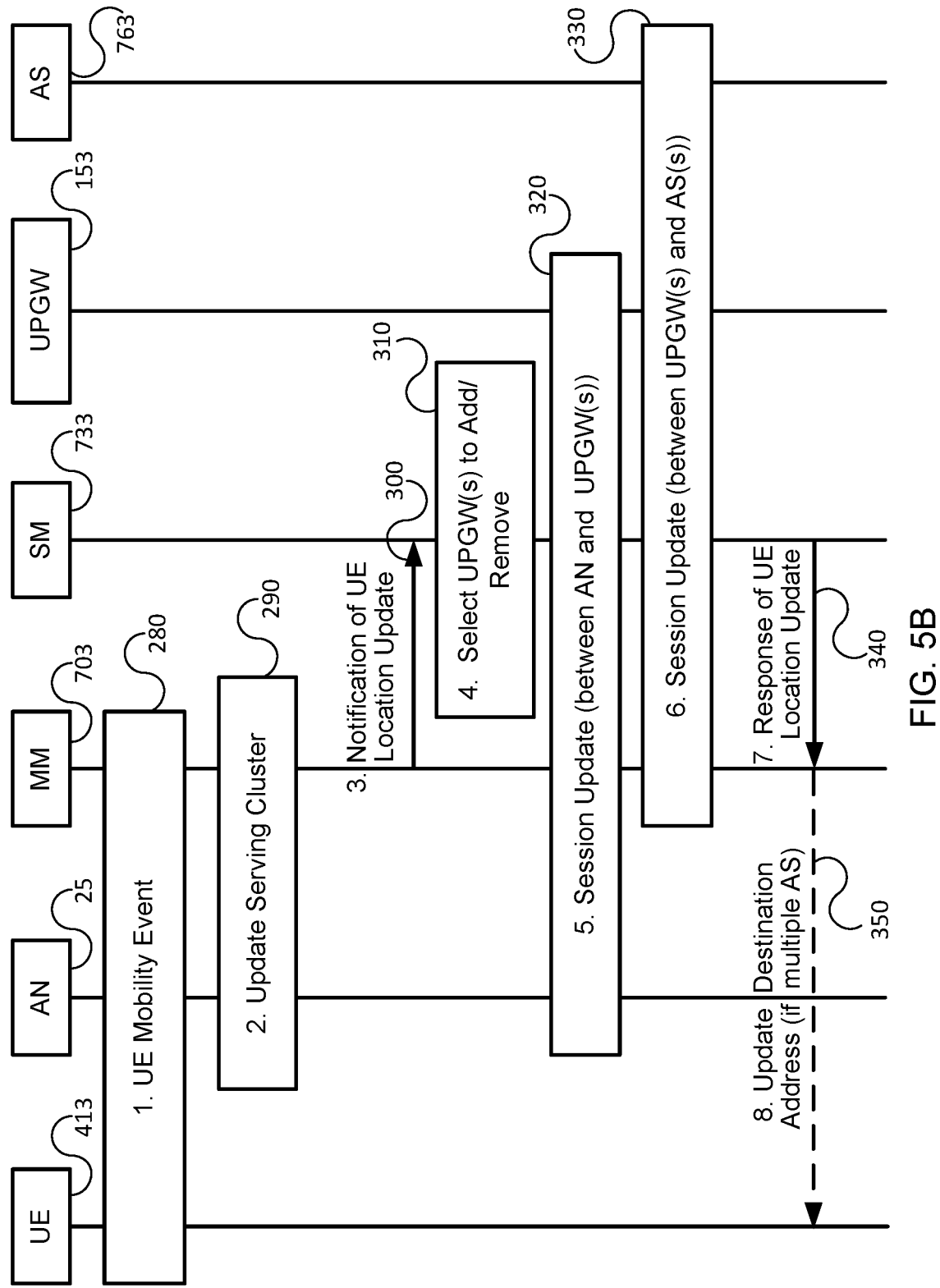
FIG. 5B illustrates another example URLLC session update procedure, according to an embodiment.

FIG. 5B illustrates another example URLLC session update procedure, according to an embodiment. For FIG. 5B, the following represent a non-limiting example of the steps of such a procedure:

1. The UE 413 location update or location tracking procedure is performed 280. This procedure involves the UE 413, the AN 25 nodes and the MM 703 NF.

2. The MM 703 determines if a AN 25 node should be added or removed from the UE's serving cluster 290.

3. The MM 703 sends a notification of the UE 413 location update to the SM 733 including the UE's serving cluster information 300.

4. Then, at 310, the SM 733 determines if a UPGW 153 should be added or removed for the UE 413 based on the information from the MM 703.

5. The SM 733 updates the URLLC session 320 between the AN 25 and the UPGW 153. If a new UPGW 153 is added, a new path is established. Otherwise, it terminates a path if a UPGW 153 is removed.

6. The SM 733 updates the URLLC session 330 between the UPGW(s) and the AS 763. In both scenario one and two, the SM 733, informs the AS(s) 763 of the IP address of the UPGWs 153 to be added or removed. In scenario 2, the SM 733 may update the NAT association information for each UPGW 153.

7. The SM 733 sends a Response of UE Location Update 340 to the MM 703.

8. If there are multiple local networks then the MM 703 may send an Update Destination Address 350 to update the new primary server IP address to the UE 413 if the primary destination address has changed.

Figure 6:
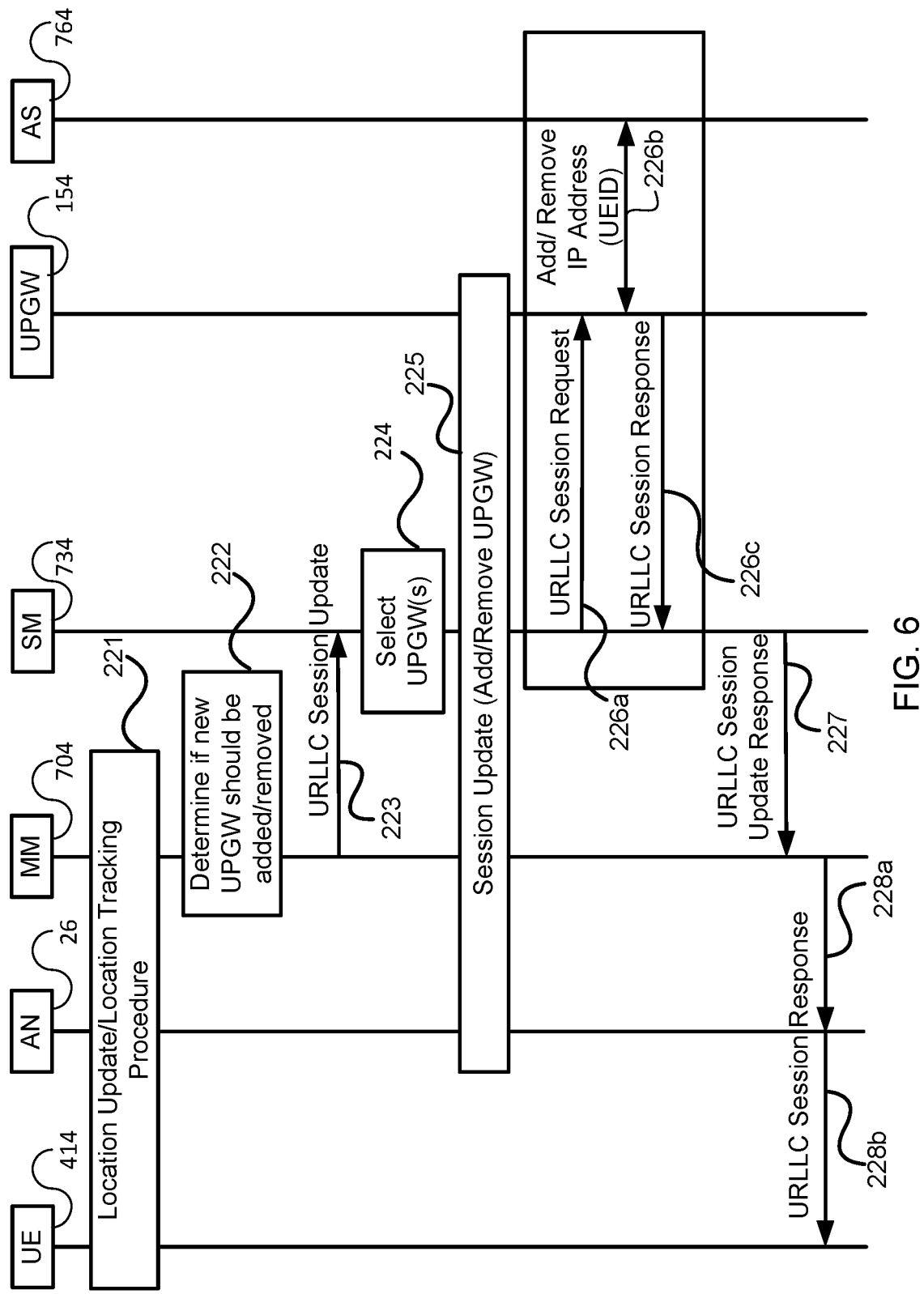
FIG. 6 illustrates another example of a session setup between the UPGW and the AS, according to an embodiment.

FIG. 6 illustrates another example of a session setup between the UPGW 154 and the AS 764, according to an embodiment. At Step 21, the location update or location tracking procedure 221 is performed. This procedure involves the UE 414, the ANs 26 and the MM 704 NF. At Step 22(222), the MM 704 determines if a new UPGW 154 should be added for the UE based on such factors as the location information and if new ANs/TRPs have been added to or removed from the UE's serving cluster. At Step 23, the MM sends a Session Update Request 223 to the SM 734. At Step 24(224), the SM 734 selects UPGWs 154 if needed. At Step 25(225), the SM 734 establishes a new session if a new UPGW 154 is added. Otherwise, it terminates a session if a UPGW 154 is removed. The SM 734 also updates the URLLC session between the UPGW(s) 154 and the AS 764. In some embodiments a new session is not established each time a new UPGW is added. Rather a 'sub-session' is an added to the ongoing URLL session via the newly added UPGW. This 'sub-session' is essentially, an update to the ongoing URLL session. If each UPGW 154 has a breakout to a local network then the session is updated between each UPGW 154 and the corresponding AS 764 in the local network. Step 26 includes 3 components including sending a request 226*a*, adding (or alternatively removing) an UE 414 IP address (UEID) at step 226*b*, and then sending a response back (step 226*c*). At Step 27, the SM 734 sends a Session Update Response 227 to the MM 704. If there are multiple local DNs, at Step 28, the MM 704 sends an Update Destination Address 228*b* to the UE 414 if the primary destination address has changed. It should be appreciated that MM 704 sends the Update Destination Address 228*a* to to AN 26 which then sends Update Destination Address 228*b* to UE 414. If a UPGW 154 is removed then the system sends a remove UPGW message to the AS.

Figure 9:
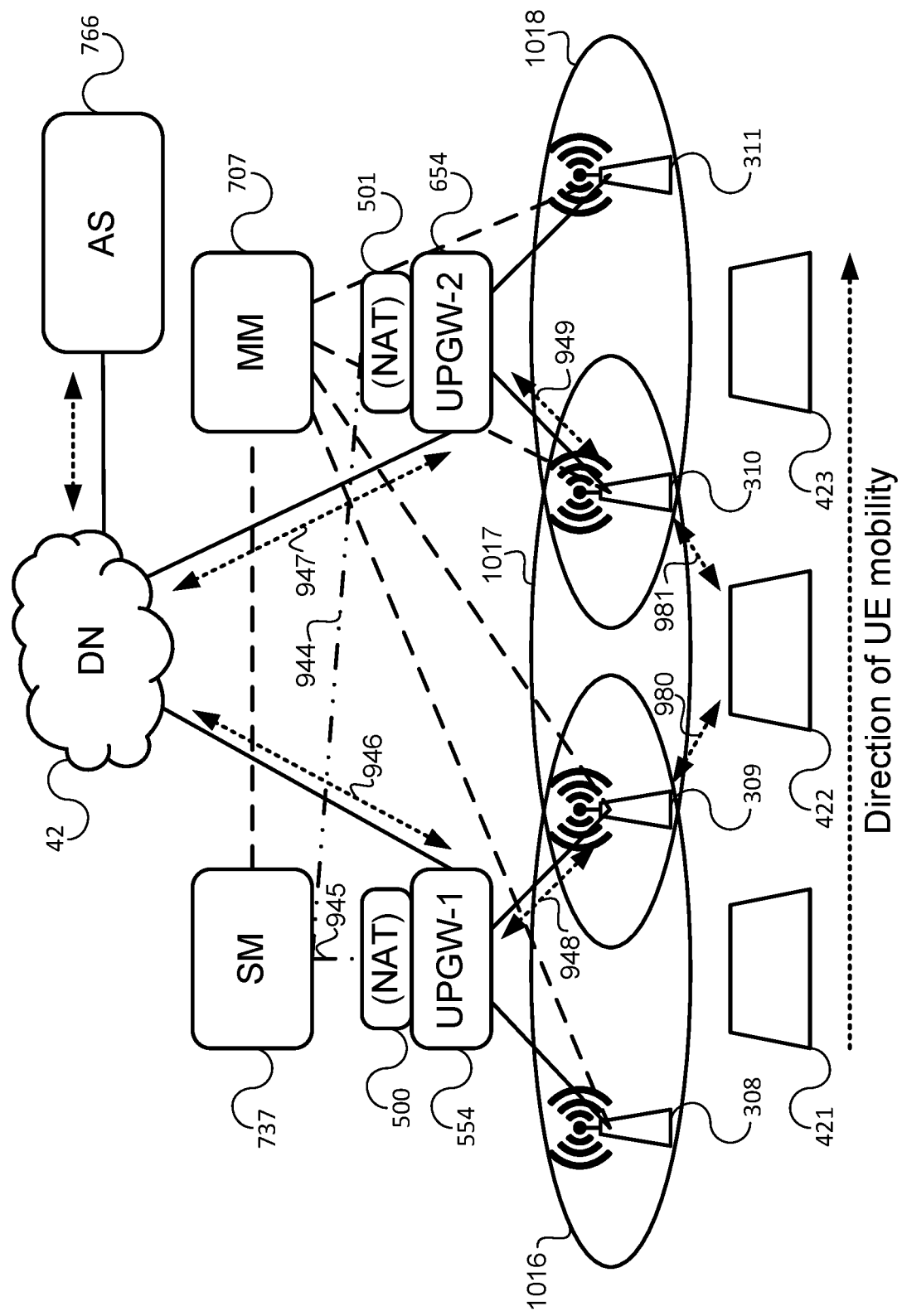
FIG. 9 illustrates an example of Session Continuity with AS supported via UL/DL NAT based forwarding according to an embodiment.
Figure 10:
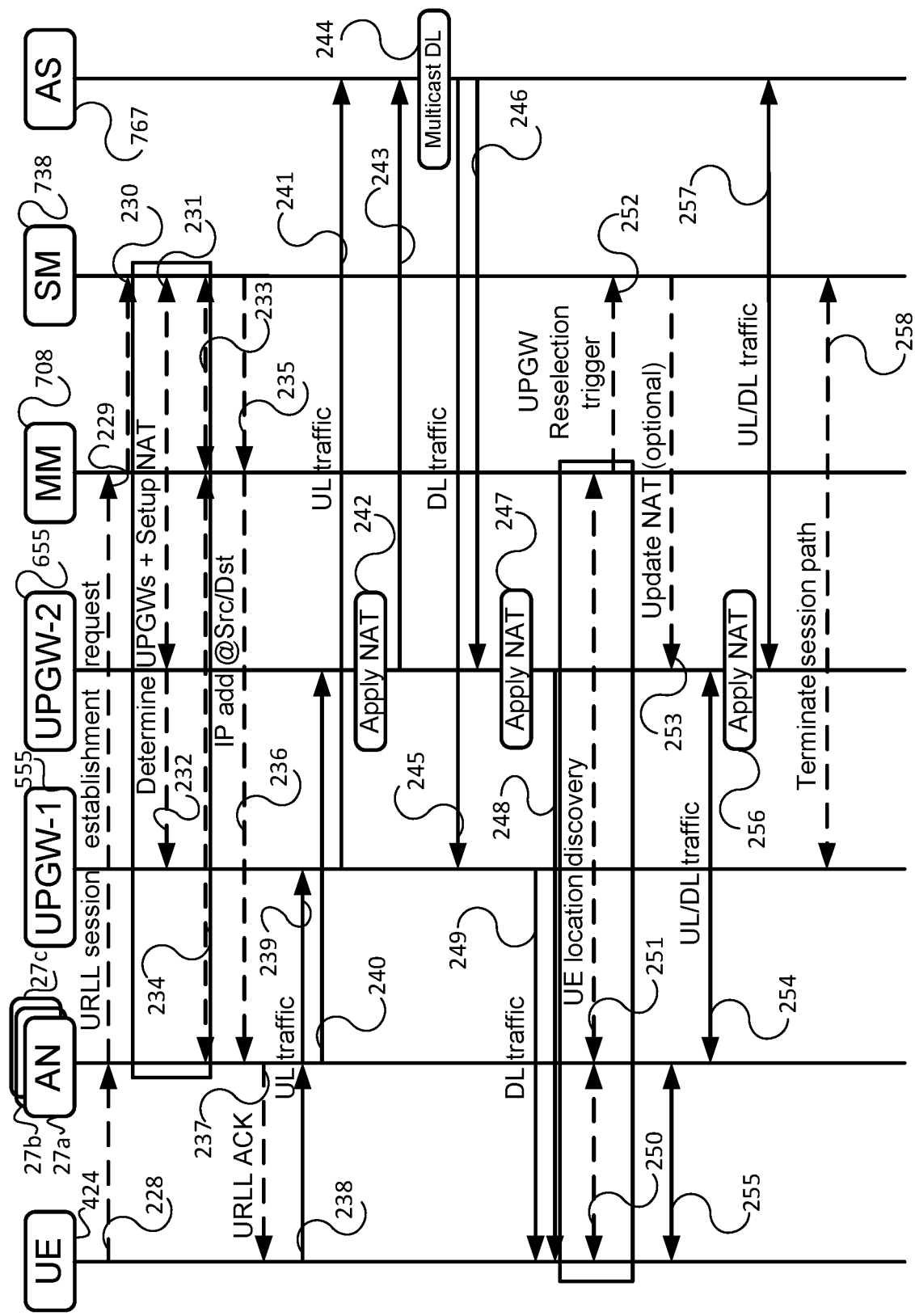
FIG. 10 illustrates the message flows for an example procedure for the scenario of FIG. 9, according to an embodiment.

FIG. 9 illustrates an example of Session Continuity with AS 766 supported via UL/DL NAT 500 and 501 based forwarding according to an embodiment. In this example the packet forwarding between the UE 421, 422, 423 and AS 766 done via the UPGWs 554 and 654 which utilize NAT 500 and 501, configurable by the SM 737. In FIG. 9, dotted lines represent the UP transmission paths used in the URLL session, the solid lines represent the available UP transmission paths and the dashed lines represent control plane (CP) links (for signaling). The lines that are a combination of dashed and dotted lines (944 and 945) are both CP links for signalling as well as UP transmission paths. As UE moves serving clusters can change. For example, in FIG. 9—several serving clusters (1016, 1017, 1018 in FIG. 9) are shown to illustrate the ANs which comprise the serving cluster change. For example, at position 421 the serving cluster 1016 includes ANs 308 and 309. At position 422 the serving cluster 1017 includes ANs 309 and 310. At position 432 the serving cluster includes ANs 310 and 311. ANs can include access points, base stations or Remote Radio Heads with associated baseband units. These different serving clusters provide paths to the DN through different UPGWs. When the UE is connected to more than one ANs, it has multiple redundant paths to the DN. FIG. 9 shows UE 422 connected to DN 42 through two redundant paths. UE 422 is connected to AN309 via 980 and AN310 via 981. AN309 is then connected to UPGW-1 554 via 948 and UPGW-1 554 to DN 42 via 946. AN310 is connected to UPGW-2 654 via 949 and UPGW-2 654 to DN 42 via 947. FIG. 10 illustrates the message flows for an example procedure for the scenario of FIG. 9, according to an embodiment. The UE 424 sends a URLL session establishment request to the SM 738. It should be appreciated that this request 228 is first sent by the UE 424 to AN 27. The AN then sends request 229 to MM function 708, which forwards the request 230 to the SM 738. The SM 738 determines the UPGWs 555 and 655 (1 primary and multiple secondary) that can satisfy the URLL session requirements via messages 231 and 232. SM 738 then informs MM 708 which UPGWs are in the configuration via 233. MM 708 in turn informs AN 27 which UPGWs are in the configuration via messages 234. AN 27 then informs UE 424 which UPGWs are in the configuration via URLL ACK 237. The source IP address to be assigned to the UE 424 is identified in relation to the primary selected UPGW. This source address identifies the established URLL session. The SM 738 also configures the NAT in secondary UPGWs to map from the source IP address (used by UE 424 in UL) to an alternate source IP address which uniquely identifies the secondary UPGWs. In the URLL session establishment Response message 235, the SM 738 provides the source address and destination address (AS address) to the UE 424 via the MM 708. It should be appreciated that MM 708 then provides this source and destination address (AS address) to AN 27 via message 236. AN 27 in turn provides this source and destination address (AS address) to UE 424 via URLL ACK 237. These addresses are to be used by the UE 424 in the uplink. In the uplink (UL) 238, the UE's transmission is received by multiple ANs in the UE 424 specific cell-cluster that can be associated to different UPGWs. AN 27*a* then passes this UL traffic 239 to UPGW-1 555. AN 27*b* also passes the UL traffic 240 to UPGW-2 655. The primary UPGW will forward the packets 241 to the AS 767 without any address change. The secondary UPGWs 655 will forward 243 to the AS 767 after applying NAT 242 (mapping from UE's source address to a UPGW specific address). In the downlink (DL), the AS multicasts the packets 244 over multiple paths to the UE 424 via the previously used UPGWs. The packets 245 received by the primary UPGW-1 555 will be forwarded as DL traffic 249 to the UE 424 without any address change. It should be appreciated that secondary UPGW 655 receives DL packets 246 from AS 767. The secondary UPGWs 655 will forward the packets 248 after applying NAT 247 (mapping from the UPGW specific address to the UE's original source address). As UE 424 moves, its new location is discovered by MM 708. As a result, MM 708 adds additional AN 27*s* and/or removes AN 27*s* from UE 424's serving cluster via UE Location Discovery 251. UE 424 learns which AN 27*s* are in its serving cluster via message 250 with AN 27. MM 708 informs SM 738 of changes to UE 424's serving cluster via UPGW reselection trigger 252. SM 738 can modify the UPGW 2's NAT table via Update NAT message 253. If SM 738 updates the NAT table, UL traffic 254 from AN 27*c* to UPGW-2 655 will have updated address mapping by apply NAT step 256. UL traffic 257 will then be routed to a new location in AS 767 corresponding to the address mapping applied by apply NAT step 256. Downlink traffic 257 from AS 767 to UPGW-2 655 will also be subject to the revised address translation applied by apply NAT step 256. The DL traffic 254 that is transmitted by UPGW-2 655 to AN 27 will have the original destination address UE 424 used when it sent UL traffic 255 applied as its source address. As the UE 424 moves out of coverage of any UPGWs 555 and 655, the SM 738 terminates the session path 258 via the affected UPGWs and removes the NAT function if any exists via Terminate session path 258.

Figure 11:
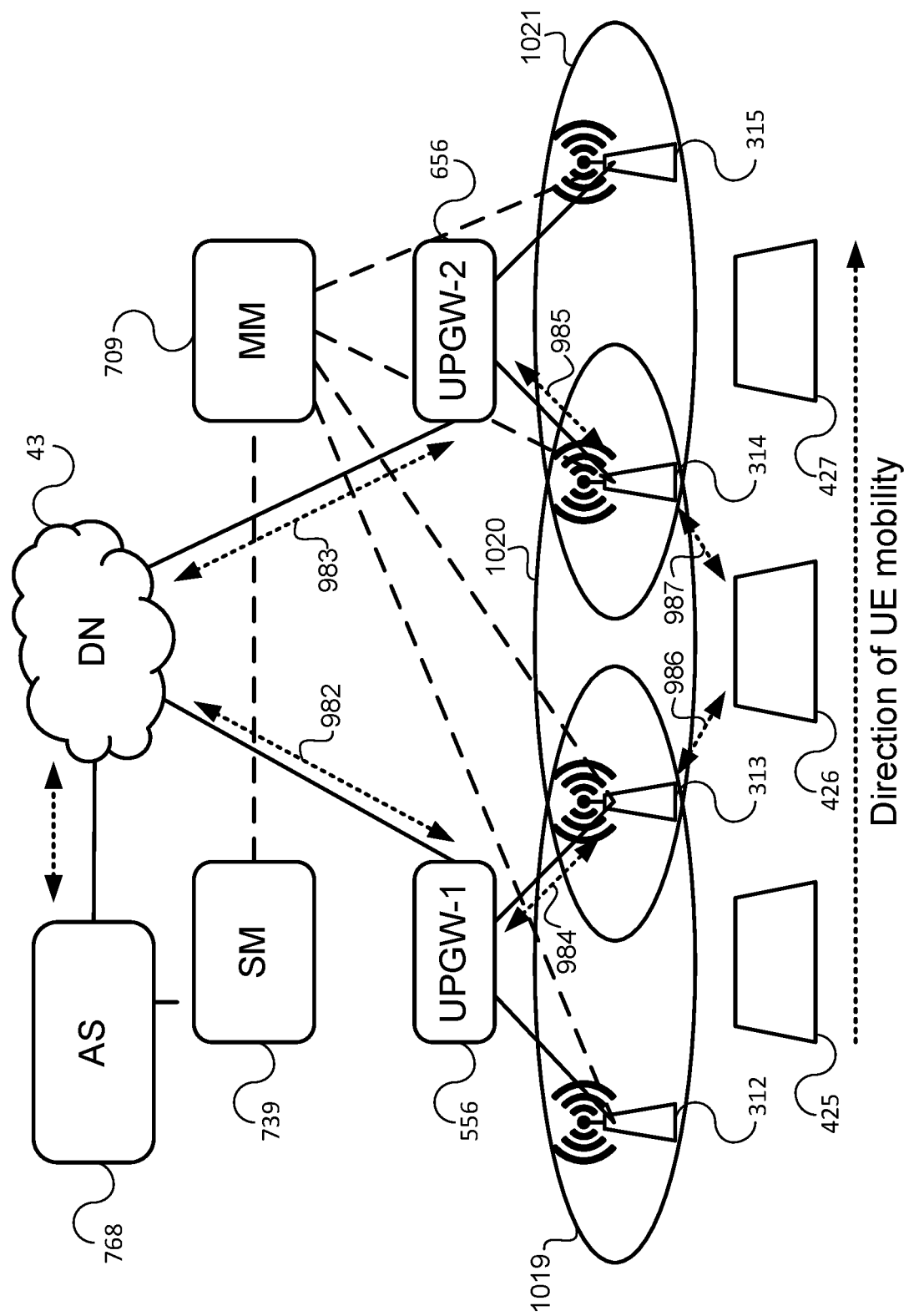
FIG. 11 illustrates an example of Session Continuity with AS supported via CN-AS interface+DL-NAT, according to an embodiment.
Figure 12:
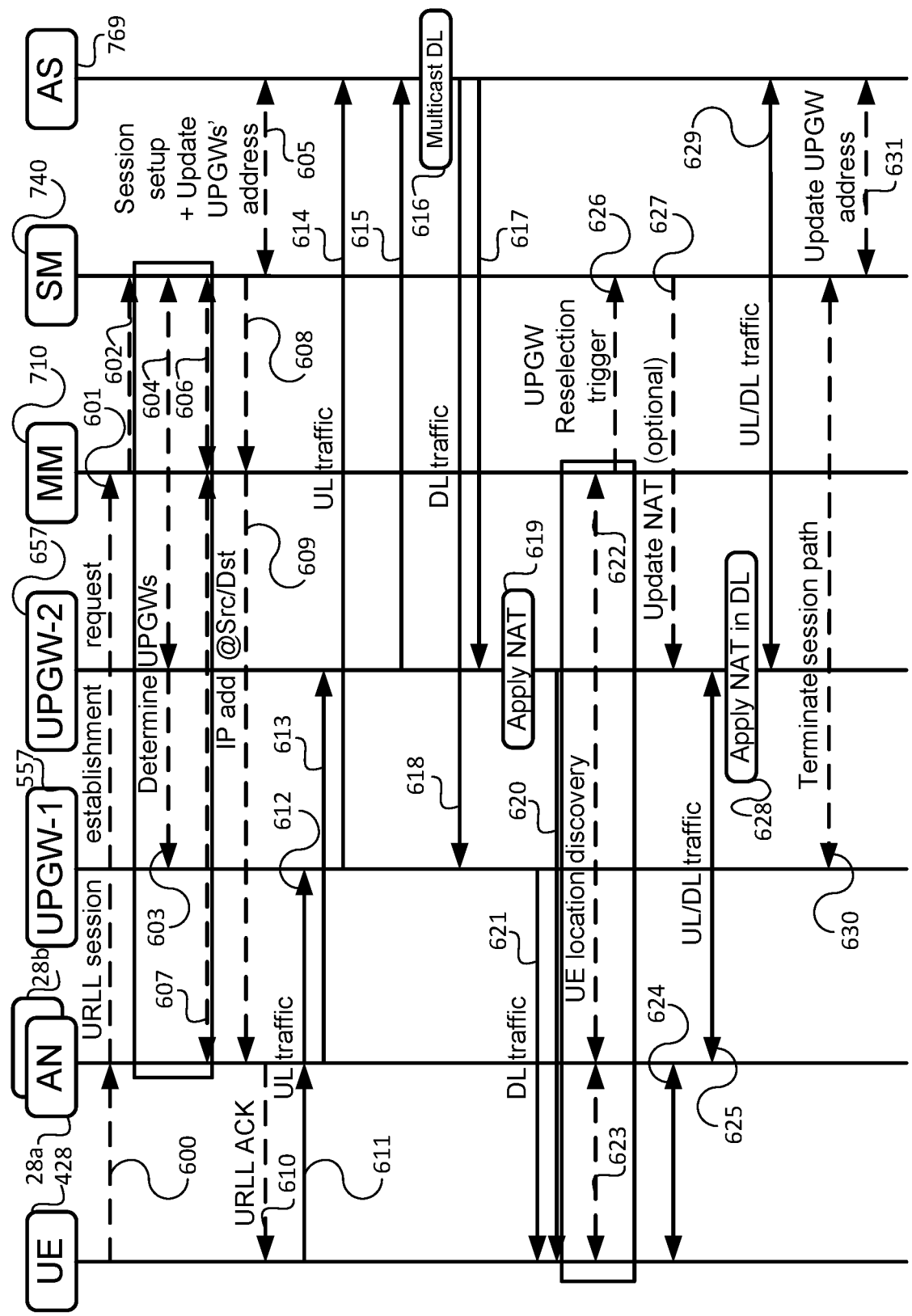
FIG. 12 illustrates the message flows for an example procedure for the scenario of FIG. 11, according to an embodiment.

FIG. 11 illustrates an example of Session Continuity with AS 768 supported via CN-AS interface+DL-NAT, according to an embodiment. In this scenario, the packet forwarding between the UE 425, 426, 427 and AS 768 via the UPGWs 556 and 656 is performed by directly configuring the UPGW IP addresses at the AS 768 by the SM 739. As UE moves its serving clusters can change. For example, in FIG. 11—several serving clusters (1019, 1020, 1021) are shown to illustrate the ANs which comprise the serving cluster change. For example, at position 425 the serving cluster 1019 includes ANs 312 and 313. At position 426 the serving cluster 1020 includes ANs 313 and 314. At position 427 the serving cluster 1021 includes ANs 314 and 315. ANs can include access points, base stations or Remote Radio Heads with associated baseband units. These different serving clusters provide paths to the DN through different UPGWs. When the UE is connected to more than one AN, it has multiple redundant paths to the DN. FIG. 11 shows UE 426 connected to DN 43 through two redundant paths. UE 426 is connected to AN313 via 986 and AN314 via 987. AN313 is then connected to UPGW-1 556 via 984 and UPGW-1 556 to DN 43 via 982. AN314 is connected to UPGW-2 656 via 985 and UPGW-2 656 to DN 43 via 983. FIG. 12 illustrates the message flows for an example procedure for the scenario of FIG. 11, according to an embodiment. The UE 428 sends a URLL session establishment request to the SM 740. It should be appreciated that this request 600 is first sent by the UE 428 to AN 28. The AN then sends request 601 to MM function 710, which forwards the request 602 to the SM 740. The SM 740 determines the UPGWs 557 and 657 (1 primary and multiple secondary) that can satisfy the URLL session requirements via messages 604 and 603. SM 740 then informs MM 710 which UPGWs are in the configuration via 606. MM 710 in turn informs AN 28 which UPGWs are in the configuration via 607. AN 28 then informs UE 428 which UPGWs are in the configuration via URLL ACK 610. The source IP address to be assigned to UE 428 is identified in relation to the primary selected UPGW. This source address identifies the established URLL session. The SM 740 configures the DL NAT in secondary UPGWs. This DL NAT maps from the address which is unique to the secondary UPGW to the UE's original source address. The SM 740 also performs session setup with the AS 769 and notifies the UPGWs' addresses via 605. In the URLL session establishment response, the SM 740 provides the source address and/or destination address (AS address) to the UE 428 via the MM 710. It should be appreciated that the SM 740 provides this source address and/or destination address to UE 428 by first communicating these addresses to MM 710 via message 608. MM 710 then provides these addresses to AN 28 via IP add @ Src/Dst 609. AN 28 then provides these addresses to UE 428 via URLL ACK 610. These addresses are to be used by the UE 428 in the uplink. In the uplink (UL) 611, the UE's transmission is received by multiple ANs in the UE 428 specific cell-cluster that can be associated to different UPGWs. AN 28 passes UL traffic 612 to UPGW-1 557 and UL traffic 613 to UPGW-2 657. All UPGWs (557 and 657) will forward the packets (UL traffic 614 and UL traffic 615) to the AS 769 without any address change. In the downlink (DL), the AS 769 multicasts the packets 616 over multiple paths to the UE 428 via the previously used UPGWs. The packets received (DL traffic 618) by the primary UPGW-1 557 will be forwarded (DL traffic 621) to the UE 428 without any address change. It should be appreciated that secondary UPGWs 657 receives DL packets 617 from AS 769. The secondary UPGWs 657 will forward the packets (DL traffic 620) after applying NAT 619. As UE 428 moves, its new location is discovered by MM 710. As a result, MM 710 adds additional AN 28s and/or removes AN 28s from UE 428's serving cluster via UE Location Discovery 622. UE 428 learns which AN 28s are in its serving cluster via communication 623 with AN 28. MM 710 informs SM 740 of changes to UE 428's serving cluster via UPGW reselection trigger 626. SM 740 can modify the UGPW2's NAT table via Update NAT message 627. If SM 740 updates the NAT table, DL traffic from AS 769 to UPGWs 657 will have updated UPGW address mapping applied by apply NAT in DL step 628. Apply NAT in DL 628 will modify the source address of DL traffic 629 to the original destination address UE 428 used when it sent UL traffic 624. Note that UL traffic 624, 625, and 629 will not have address translation applied to the traffic's destination address. As the UE 428 moves out of coverage of any UPGWs, the SM 740 terminates the session path via the affected UPGWs and removes the DL NAT function if any exists via Terminate session path message 630. The SM 740 also updates the addition/removal of the UPGWs to the AS 769 via session update request (Update UPGW address message 631).

Figure 13:
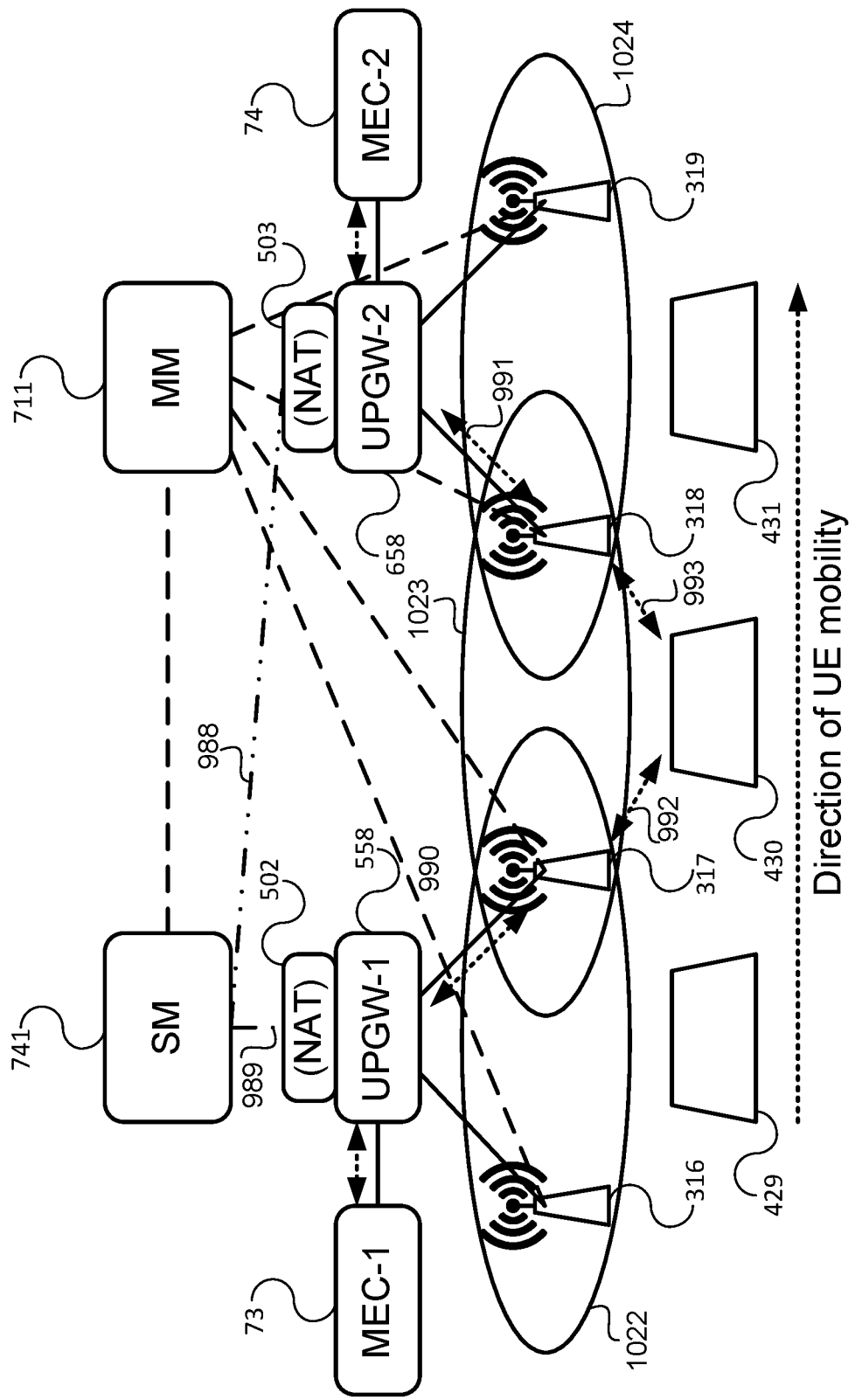
FIG. 13 illustrates an example of Session Continuity with MEC supported via UL/DL NAT based forwarding, according to an embodiment.

FIG. 13 illustrates an example of Session Continuity with MEC-1 73 and MEC-2 74 supported via UL/DL NAT 502 and 503 based forwarding, according to an embodiment. The packet forwarding between the UE 429, 430, 431 and MEC-1 73 and MEC-2 74 servers via the UPGWs 558 and 658 relies on NAT 502 and 503, configurable by the SM 741. As UE moves its serving cluster can change. For example, in FIG. 13—several serving clusters (1022, 1023, 1024 in FIG. 13) are shown to illustrate the ANs which comprise the serving cluster change. For example, at position 429 the serving cluster 1022 includes ANs 316 and 317. At position 430 the serving cluster 1023 includes ANs 317 and 318. At position 431 the serving cluster included ANs 318 and 319. ANs can include access points, base stations or Remote Radio Heads with associated baseband units. These different serving clusters provide paths to the DN through different UPGWs. When the UE is connected to more than one AN, it has multiple redundant paths to the DN. As the UE moves (as represented by UE positions 429, 430, 431), MM 711 determines which ANs316, 317, 318, 319 are in range of the UE and should be added and/or removed from the UE's serving cluster. MM 711 informs SM 741 of these additions to and/or deletions from the serving cluster. SM 741 may in turn update NAT 502's and NAT 503's address translation table(s). MM 711 also informs UE 429, 430, 431 of ANs included in its serving cluster by relaying this information to the UE via ANs 316, 317, 318, 319. In FIG. 13, once again dotted lines represent the UP transmission paths used in the URLL session, the solid lines represent the available UP transmission paths and the dashed lines represent control plane (CP) links (for signaling). The lines that are a combination of dashed and dotted lines (988 and 989) are both CP links for signalling as well as UP transmission paths. FIG. 13 shows UE 430 connected through two redundant paths. UE at position 430 is connected to AN 317 via 992 and AN318 via 993. AN 317 is then connected to UPGW-1 558 via 990. AN318 is connected to UPGW-2 658 via 991.

Figure 14:
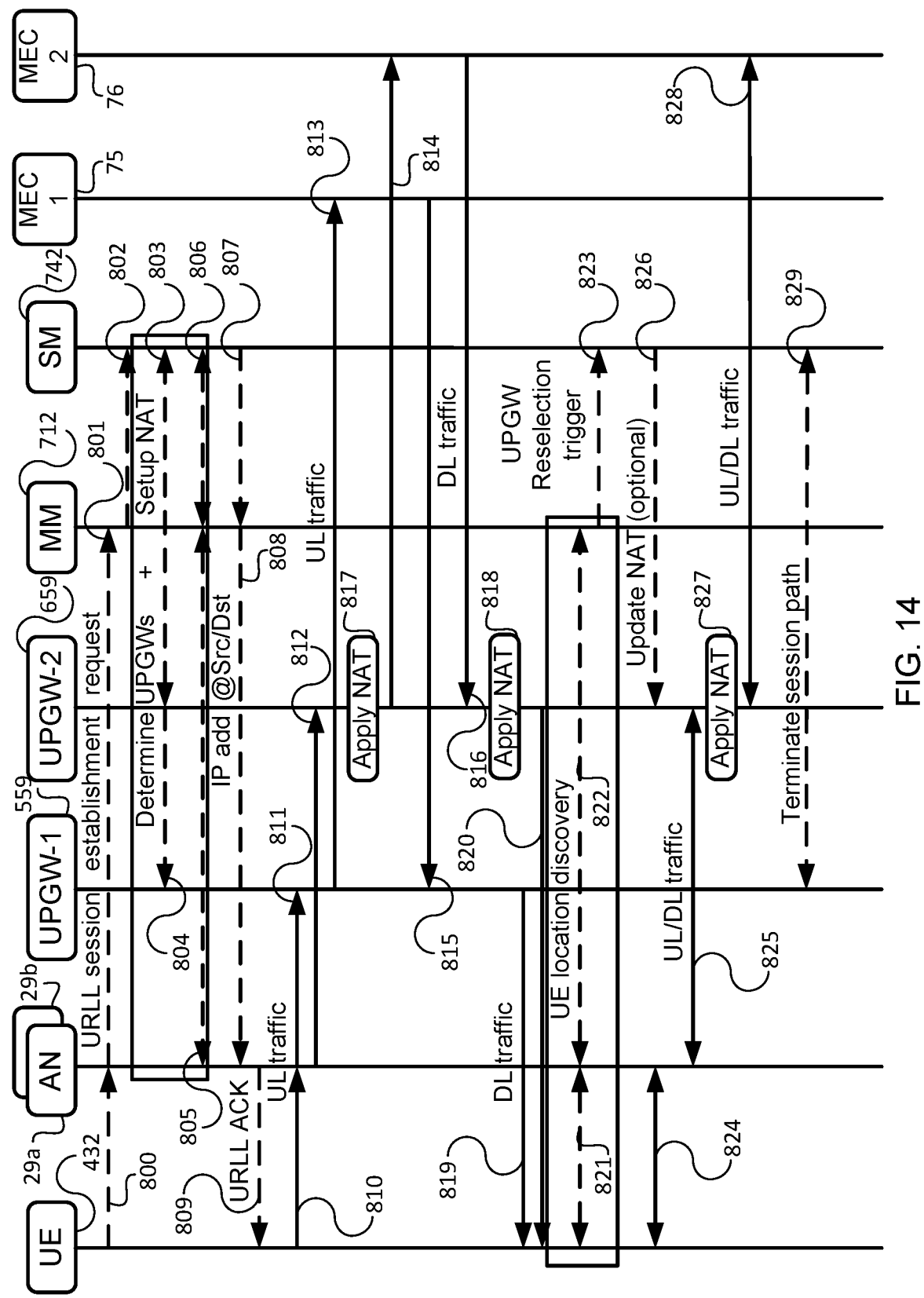
FIG. 14 illustrates the message flows for an example procedure for the scenario of FIG. 13, according to an embodiment.

FIG. 14 illustrates the message flows for an example procedure for the scenario of FIG. 13, according to an embodiment. The UE 432 sends a URLL session establishment request to the SM 742. It should be appreciated that the URLL session establishment request 800 is first sent by the UE 432 to AN 29. The AN then sends request 801 to MM function 712, which forwards the request 802 to the SM 742. The SM 742 determines the UPGWs 559 and 659 (1 primary and multiple secondary) that can satisfy the URLL session requirements between the UE 432 and MEC servers 75 and 76 Via messages 803 and 804. SM 742 then informs MM 712 which UPGWs are in the configuration via message 806. MM 712 informs AN 29 which UPGWs are in the configuration via message 805. The source IP address to be assigned to UE 432 is identified in relation to the primary selected UPGW. This source address identifies the established URLL session. The SM 742 also configures the NAT in secondary UPGWs via 803 to map from the source IP address (used by UE 432 in UL) to an alternate source IP address which uniquely identifies the secondary UPGWs. It should be appreciated that the SM 742 provides this source address and/or destination address to UE 432 by first communicating these addresses to MM 712 via message 807. MM 712 then provides these addresses to AN 29 via IP add @ source/destination (Src/Dst) message 808. AN 29 then provides these addresses to UE 432 via URLL ACK 809. In the case when the MEC 75 and 76 servers are directly connected to the UPGWs (i.e. no intermediary network nodes), then it is not required to setup NAT in the secondary UPGWs. In the URLL session establishment response, the SM 742 provides the source address and destination address (primary MEC server) to the UE 432 via the MM 712. These source and destination addresses are to be used by UE 432 in the uplink. In the uplink (UL), the UE's transmission 810 is received by multiple ANs in the UE specific cell-cluster that can be associated to different UPGWs. AN 29 forwards UL traffic 811 to UPGW-1 559 and UL traffic 812 to UPGW-2 659. The primary UPGW-1 559 will forward the packets to the primary MEC server 75 without any address change via UL traffic 813. The secondary UPGWs 659 will forward to their corresponding MEC servers 76 via UL traffic 814 after applying NAT step 817 (source and destination address change). In the case when the MEC servers are directly connected to the UPGWs, it is not required to apply NAT. In the downlink (DL), each MEC server 75 and 76 sends the packets to the UE 432 via the previously used UPGWs. The packets received by the primary UPGW-1 559 will be forwarded to the UE 432 without any address change via DL traffic 819. The secondary UPGWs 659 will forward the packets 820 after applying NAT step 818. In the case when the MEC servers are directly connected to the UPGWs, it is not required to apply NAT. As UE 432 moves, its new location is discovered by MM 712. As a result, MM 712 adds additional AN 29s and/or removes AN 29s from UE 432's serving cluster via UE Location Discovery 822. UE 432 learns which AN 29s are in its serving cluster via communication 821 with AN 29. MM 712 informs SM 742 of changes to UE 432's serving cluster via UPGW reselection trigger 823. SM 742 can modify the NAT's address translation table via Update NAT message 826. If SM 742 updates the NAT table, UL traffic 825 from AN 29 to UPGW-2 659 will have updated address mapping applied by apply NAT step 827 to UL traffic 825. UL traffic 828 will then be routed to a new location in MEC2 76 corresponding to the address mapping applied by apply NAT step 827. Downlink traffic 828 from MEC2 76 to UPGW-2 659 will also be subject to the revised address translation applied by NAT 827. The DL traffic 825 that is transmitted by UPGW-2 659 to AN 29 will have the original destination address UE 432 used when it sent UL traffic 824 applied as its source address. As the UE 432 moves out of coverage of any UPGWs, the SM 742 terminates the session path via the affected UPGWs and removes the NAT function if any exists via Terminate session path 829.

Figure 15:
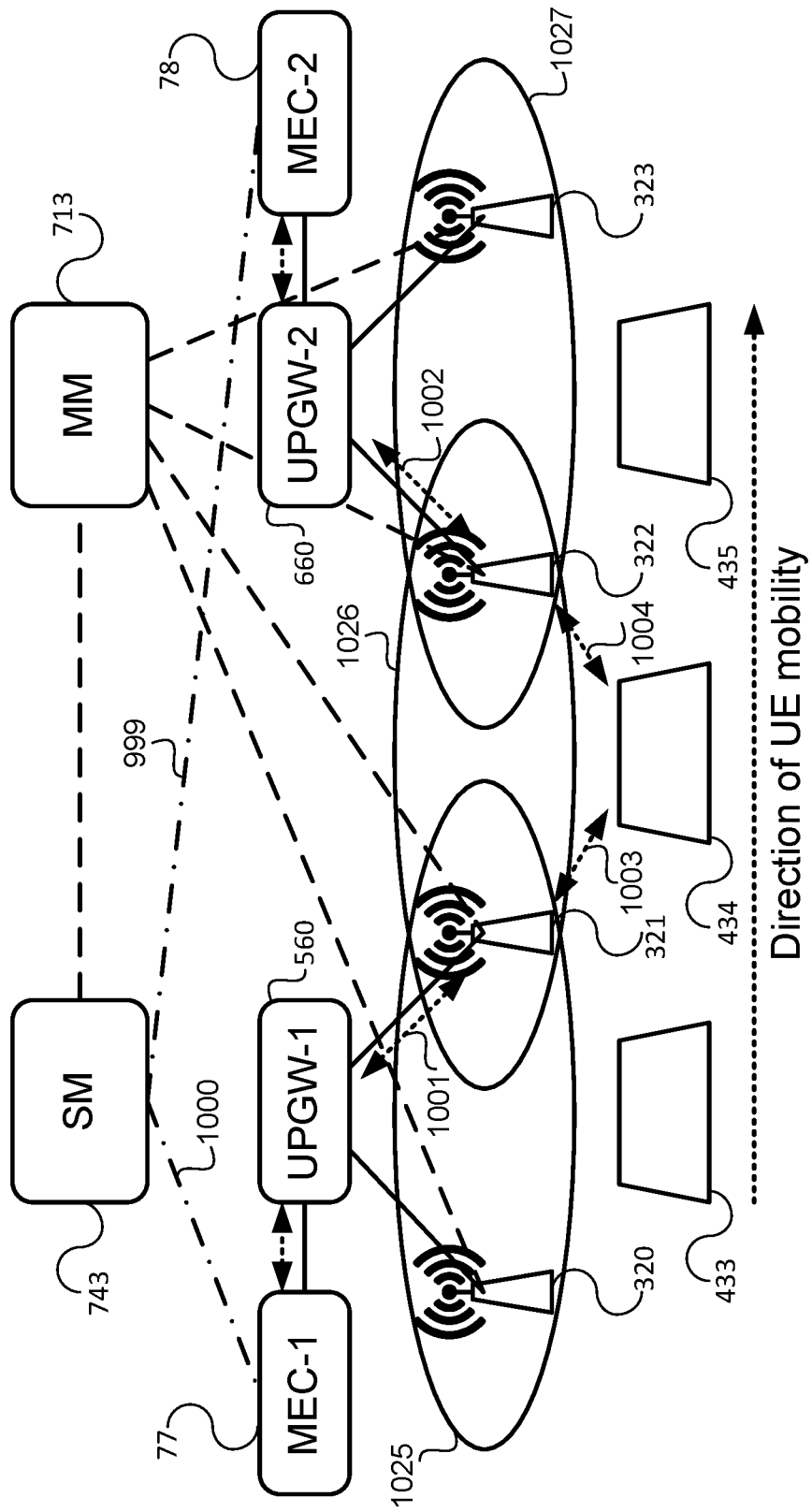
FIG. 15 illustrates an example of Session Continuity with MEC supported via CN-MEC interface+DL-NAT, according to an embodiment.
Figure 16:
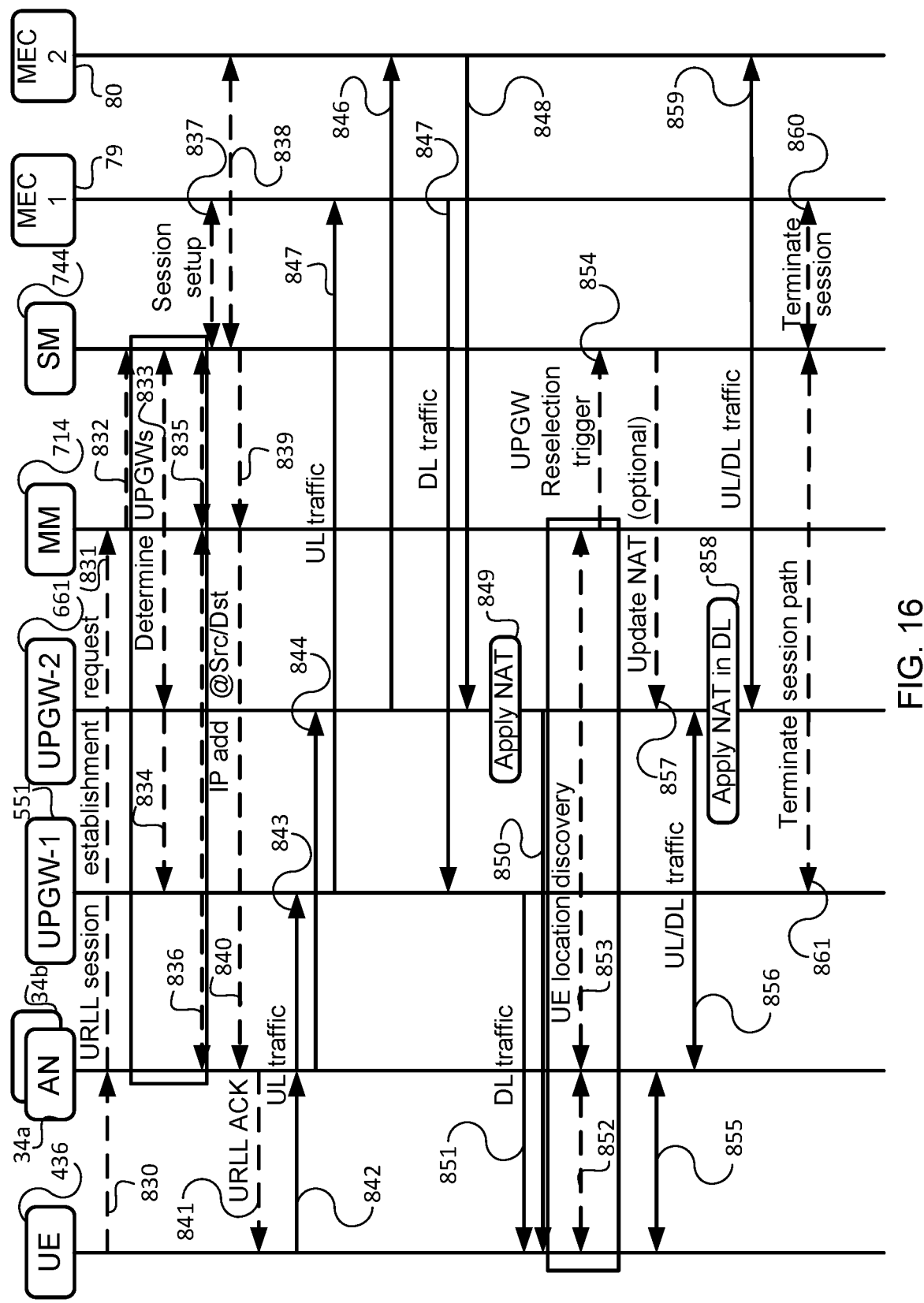
FIG. 16 illustrates the message flows for an example procedure for the scenario of FIG. 15, according to an embodiment.

FIG. 15 illustrates an example of Session Continuity with MEC supported via CN-MEC interface+DL-NAT, according to an embodiment. The packet forwarding between the UE 433, 434, 435 and AS (e.g., MEC-1 77 and MEC-2 78) via the UPGWs 560 and 660 is performed by directly configuring the UPGW IP addresses at the AS (e.g., MEC 77 and 78) by the SM 743. As UE moves, serving clusters can change. For example, in FIG. 15—several serving clusters (1025, 1026, 1027) are shown to illustrate the ANs which comprise the serving cluster change. For example, at position 433 the serving cluster 1025 includes ANs 320 and 321. At position 434 the serving cluster 1026 includes ANs 321 and 322. At position 435 the serving cluster 1027 includes ANs 322 and 323. ANs can include access points, base stations Remote Radio Heads with associated baseband units. These different serving clusters provide paths to the DN through different UPGWs. When the UE is connected to more than one AN, it has multiple redundant paths to the DN. In FIG. 15, once again dotted lines represent the UP transmission paths used in the URLL session, the solid lines represent the available UP transmission paths and the dashed lines represent control plane (CP) links (for signaling). The lines that are a combination of dashed and dotted lines (999 and 1000) are both CP links for signalling as well as UP transmission paths. FIG. 15 shows UE 434 connected through two redundant paths. UE 434 is connected to AN321 via 1003 and AN322 via 1004. AN322 is then connected to UPGW-1 560 via 1001. AN322 is connected to UPGW-2 660 via 1002. FIG. 16 illustrates the message flows for an example procedure for the scenario of FIG. 15, according to an embodiment. The UE 436 sends a URLL session establishment request to the SM 744. It should be appreciated that the URLL session establishment request 830 is first sent by the UE 436 to AN 34. The AN then sends request 831 to MM function 714, which forwards the request 832 to the SM 744. The SM 744 determines the UPGWs 551 and 661 (1 primary and multiple secondary) that can satisfy the URLL session requirements between the UE 436 and MEC servers 79 and 80 via messages 833 and 834. SM 744 then informs MM 714 which UPGWs to use via messages 835. MM 714 informs AN 34 which UPGWs to use via message 836. The source IP address to be assigned to UE 436 is identified in relation to the primary selected UPGW. This source address identifies the established URLL session. The SM 744 also configures the DL-NAT in secondary UPGWs via 833. This DL NAT maps from the address which is unique to the UPGW to the UE's original source address. The SM 744 also performs session setup with the MEC servers 79 and 80 via 837 and 838 and notifies the UPGWs' addresses. In the URLL session establishment ACK, the SM provides the source address and destination address (generic MEC address) to the UE 436 via the MM 714. It should be appreciated that the SM 744 provides this source address and/or destination address to UE 436 by first communicating these addresses to MM 714 via message 839. MM 712 then provides these addresses to AN 34 via IP add @ Src/Dst 840. AN 34 then provides these addresses to UE 436 via URLL ACK 841. These source and destination addresses are to be used in the uplink. In the uplink (UL), the UE's transmission (UL traffic 842) is received by multiple ANs 34 in the UE specific cell-cluster that can be associated to different UPGWs. AN 34 then forwards UL traffic 843 to UPGW-1 551 and UL traffic 844 to UPGW-2 844. All UPGWs will forward the packets to their respective MEC servers 79 and 80 without any address change via UL traffic 847 and 846. In the downlink (DL), each MEC server 79 and 80 sends the packets to the UE 436 via the previously used UPGWs. The packets received by the primary UPGW-1 551 (DL traffic 847) will be forwarded to the UE 436 without any address change. The secondary UPGWs 661 will forward the packets (DL traffic 848) after applying NAT 849. In the case when the MEC servers 79 and 80 are directly connected to the UPGWs, it is not required to apply NAT. As UE 436 moves, its new location is discovered by MM 714. As a result, MM 714 adds additional AN 34s and/or removes AN 34s from UE 436's serving cluster via UE Location Discovery 853. UE 436 learns which AN 34s are in its serving cluster via communication 852 with AN 34. MM 714 informs SM 744 of changes to UE 436's serving cluster via UPGW reselection trigger 854. SM 744 can modify the NAT table via Update NAT message 857. If SM 744 updates the NAT table, DL traffic from MEC-2 80 to UPGWs 661 will have updated UPGW address mapping applied by apply NAT in DL step 858. Apply NAT in DL step 858 will modify the source address of DL traffic 856 transmitted from UPGW-2 661 to AN 34 to the original destination address UE 436 used when it sent UL traffic 855. Note that UL traffic

855, 856, and 859 will not have address translation applied to the traffic's destination address. As the UE 436 moves out of coverage of any UPGWs, the SM 744 terminates the session path via the affected UPGWs and removes the NAT function if any exists via Terminate session path message 861. The SM 744 also updates the addition/removal of the affected UPGWs to the corresponding MEC servers 79 and 80 via session update request (terminate session 860).

While embodiments have been discussed utilizing a RAN which in some embodiments implements a serving cluster including a plurality of ANs, it is possible that there may be some circumstances, where there may only be a single AN in range (or with capacity). This may be a temporary situation until the UE moves into range of a plurality of possible ANs. In this circumstance, some embodiments establish a plurality of UPGWs to provide redundant links between the single AN and AS. In such a case, the transmission paths can branch out from each AN to multiple UPGWs.

Embodiments will now be discussed for Session management using branching functions. For multi-homed PDU Sessions, embodiments use user plane gateways (UPGWs) to provide mobility and IP anchoring functionality. Embodiments utilize a branching point (BP) to enable traffic from the UE to be split via multiple paths through multiple UPGWs in the UL direction. Similarly in the DL direction, the traffic from the DNs, routed via multiple UPGWs, is merged at the BP prior to transmitting to the UE. The BP is generally located close to the AN in order to support multi-path/multi-homing transmission capability to the UE.

In high mobility scenarios, both the UPGWs and BPs can be flexibly added/removed and the BP to UPGW paths can be established/terminated in accordance with the UE mobility. In this case, new transporting paths through new UPGWs can be added to support ongoing PDU sessions while existing paths through previous UPGWs that may be adversely affecting the session performance can be removed. At the same time, the BPs can also be added/removed in correlation with the selection/de-selection of the UPGWs.

This disclosure provides session management procedures for multi-homed PDU sessions and multiple parallel PDU Sessions (which can be used for IPv4, IPv6, IPv4/IPv6 or non-IP type sessions).

Figure 17:
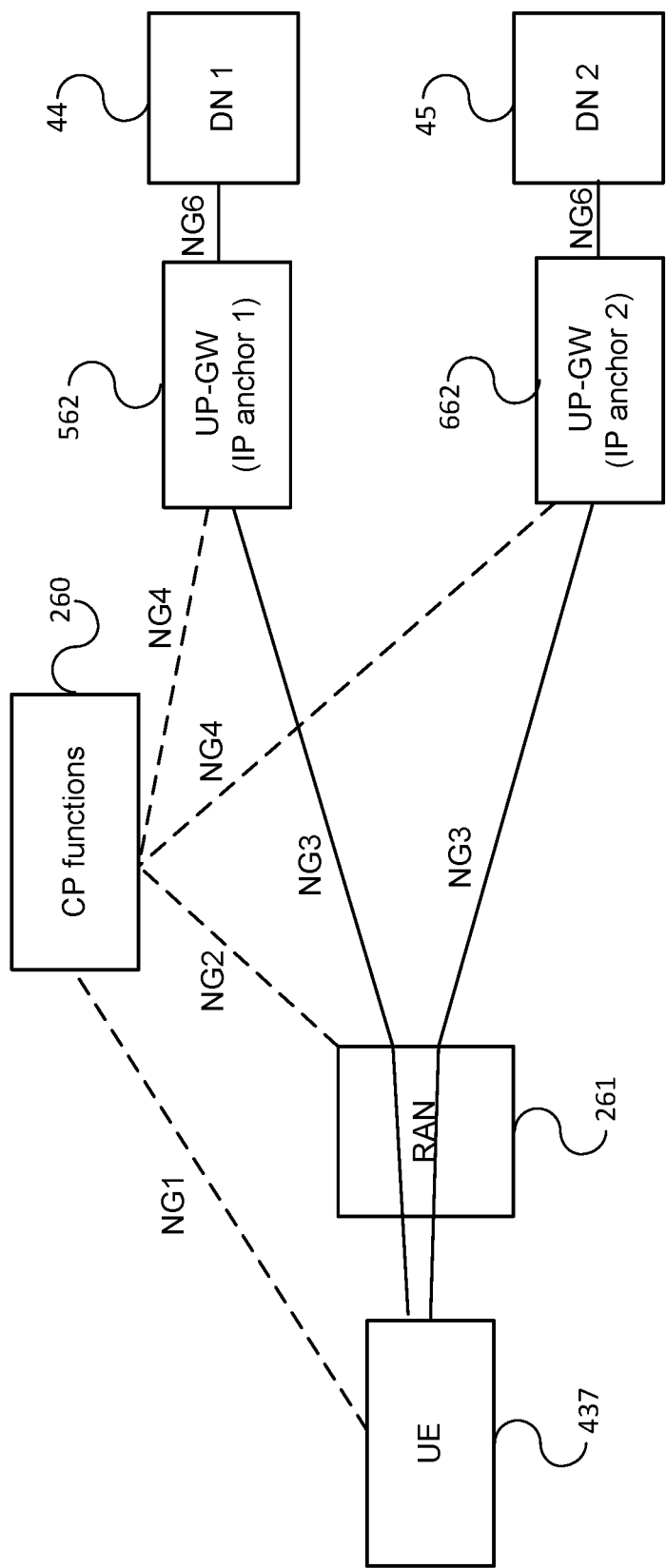
FIG. 17 illustrates an example network architecture for a Session management model with multiple parallel PDU Sessions, according to an embodiment.

FIG. 17 illustrates an example network architecture for a Session management model with multiple parallel PDU Sessions, according to an embodiment. FIG. 17 illustrates generally an embodiment in which a UE 437 with multiple PDU sessions towards different DNs 44 and 45 does not require a "convergence point" similar to the SGW. In other words, going out of the RAN 261 the user plane paths of PDU Sessions belonging to the same UE 437 may be completely disjoint. This also implies that for idle mode UEs (if NextGen_Idle state is supported) there can be a distinct buffering node per PDU Session.

It should be noted that for some embodiments which utilize session bitrate limitations across all PDU sessions (to the same data network) then a Core Network User plane "convergence point" to support across session bitrate enforcement and charging can be utilized (not shown). In some embodiments which implement such a feature than an Across-session bitrate enforcement entity which handles all the DL traffic from the same DN can be used. In which case DL traffic Charging can be performed after potential packet discard by the across-session bitrate enforcement entity.

Embodiments provide for session continuity for a network architecture which utilizes a branching point for multi-homed sessions interspersed between a RAN (which may utilize one or more serving APs) and multiple UPGWS.

Figure 18:
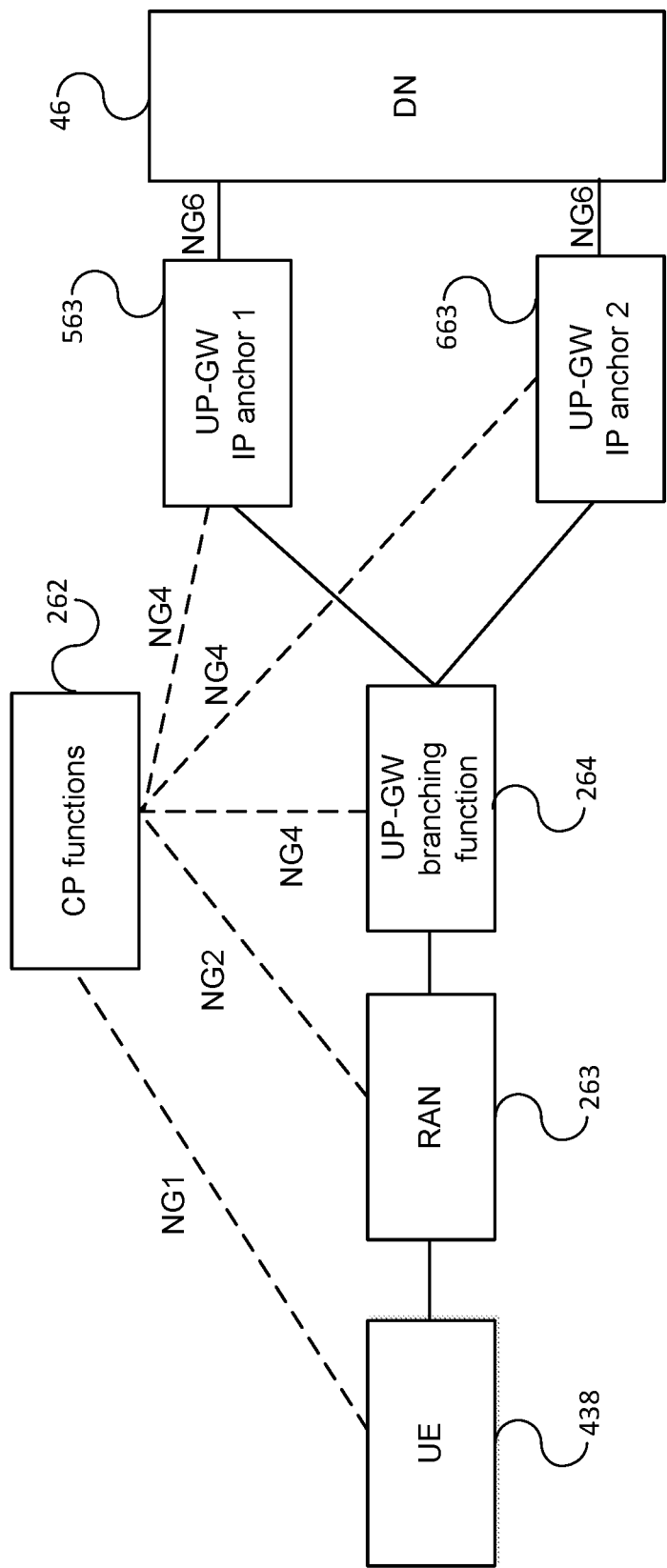
FIG. 18 illustrates another example network architecture for Session continuity for a multi-homed PDU session, according to an embodiment.
Figure 19:
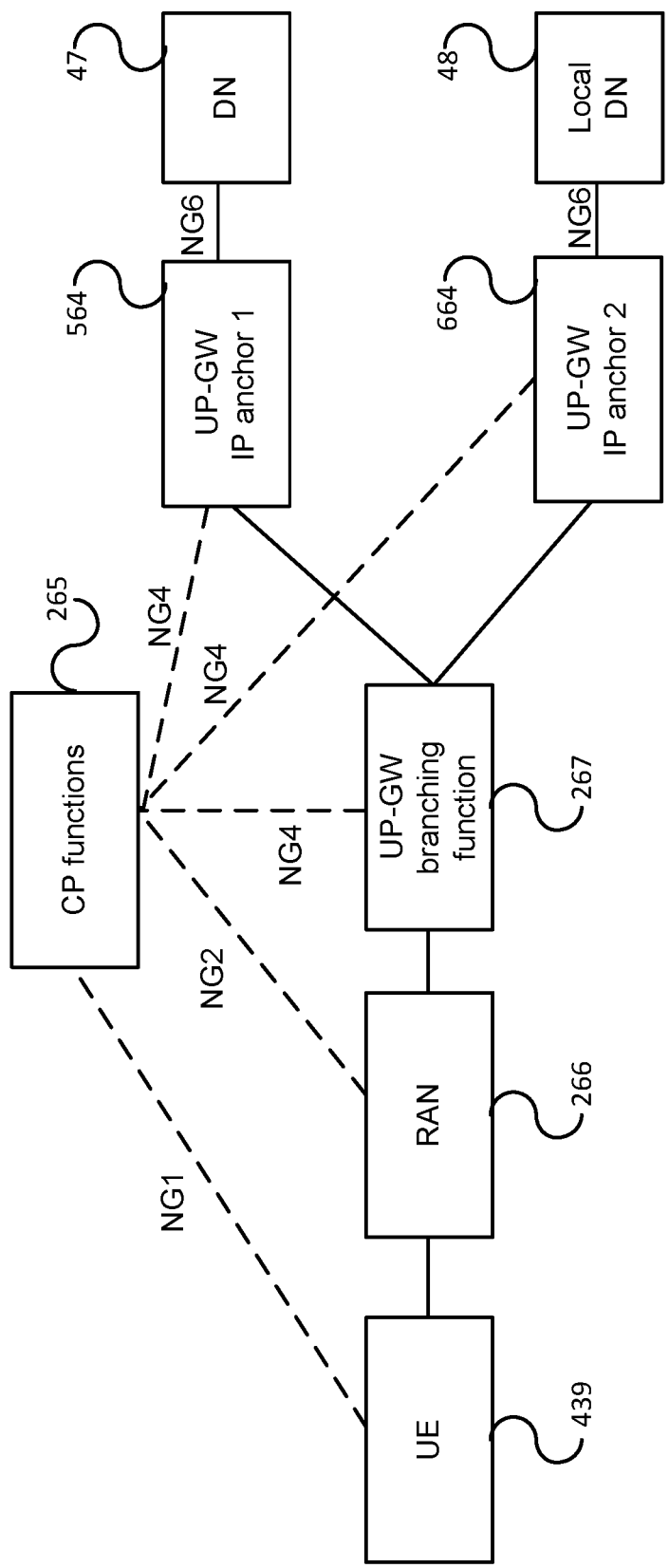
FIG. 19 illustrates another example network architecture for a multi-homed PDU session with access to a local DN, according to an embodiment.

FIG. 18 illustrates an example network architecture utilizing a branching point 264 for Session continuity for a multi-homed PDU session, according to an embodiment. FIG. 19 illustrates another example network architecture utilizing a branching point 267 for a multi-homed PDU session with access to a local DN 48, according to an embodiment.

Either architecture allows for a PDU Session establishment and release using NG1 signalling (for example as described in solution 4.2 and 4.3 of 3GPP TR 23.799). In either architecture the PDU Session can be identified with a Data Network Name (DNN). CP functions can configure user plane gateways (UP-GWs) in the user plane path for the PDU Session. The number of UP-GWs for a PDU Session can vary.

For some embodiments the user plane path can be implemented as a tunnel. There can be one tunnel per PDU Session between two entities. The tunnel can carry all traffic of a PDU Session, regardless of the QoS requirements of individual traffic flows. The tunnel encapsulation header can carry per-packet QoS markings and possibly other information. The network may decide to reconfigure the user plane path of a PDU Session outside of any UE mobility event. In some embodiments multiple PDU Sessions to the same Data Network are supported as described in Solution 4.3 (clause 6.4.3) of 3GPP TR 23.799 or by using a multi-homed PDU Session described below. A PDU Session may be associated with one or multiple IPv6 prefixes or IPv4 addresses. The latter case is referred to as multi-homed PDU Session for which an example is shown in FIG. 18. Further reference can be made to FIG. 6.4.4.1-3 of 3GPP TR 23.799. For example, in the embodiment of FIG. 18 the PDU Session provides access to the Data Network via two separate IP anchors. The two user plane paths leading to the IP anchors branch out of a "common" UP-GW referred to as "branching point". The branching point (BP) is a logical functionality which may be co-located with other entities (e.g., a UP-GW for one of the IP anchors). In some embodiments the branching point functionality ensures that uplink packets take the appropriate path based on the UE's source address or other header fields. In some embodiments the BP can enforce access point name aggregate maximum bit-rate (APN AMBR) and charging. In some embodiments the BP can split UL traffic from the UE (forwarding the traffic towards the different IP anchors) and merge DL traffic to the UE (merging the traffic from the different IP anchors towards the link towards the UE).

In some embodiments the multiple IPv6 prefixes in a PDU session can be used. For example the "branching point" can be configured as a mobility anchor that spreads the UL traffic between the IP anchors based on the Source Prefix of the PDU (selected by the UE based on policies received from the network). This corresponds to Scenario 1 defined in IETF RFC 7157 "IPv6 Multihoming without Network Address Translation". This allows to make the "Common UP-GW" unaware of the routing tables in the Data Network and to keep the first hop router function in the IP anchors.

In some embodiments the architecture of FIG. 18 can be used for multi-homed PDU Session which can support make-before-break service continuity as described in Solution 6.1 (SSC mode 3 in clause 6.6.1) in 3GPP TR 23.799 The multi-homed PDU session may also be used to support cases where UE 439 needs to access both a local service 48 (e.g. Mobile Edge Computing server) and the Internet 47 as illustrated in FIG. 19. Access to local services may also be realized using the same address/prefix as for other services.

In some embodiments the branching point may use filtering criteria other than the source IP address for uplink traffic. In some embodiments a branching point 267 for a given session may be inserted or removed by the control plane 265 on demand. For example, when a session is first created initially with a single address/prefix, no branching point is needed. When a new address/prefix is added to the session, a branching point may be inserted. After the release of the additional addresses/prefixed, the branching point may be removed by the control plane when there is only a single address/prefix for the session.

Embodiments of Session management procedures for multiple-homed PDU sessions will now be discussed. While the UPGW provides the mobility and IP anchoring functionality, the BP enables traffic from the UE to be split via multiple paths through multiple UPGWs in the UL direction. Similarly in the DL, the traffic from the AS, routed via multiple UPGWs, is merged at the BP prior to transmitting to the UE. The BP is generally located close to the AN in order to support multi-path/multi-homing transmission capability.

Figure 20:
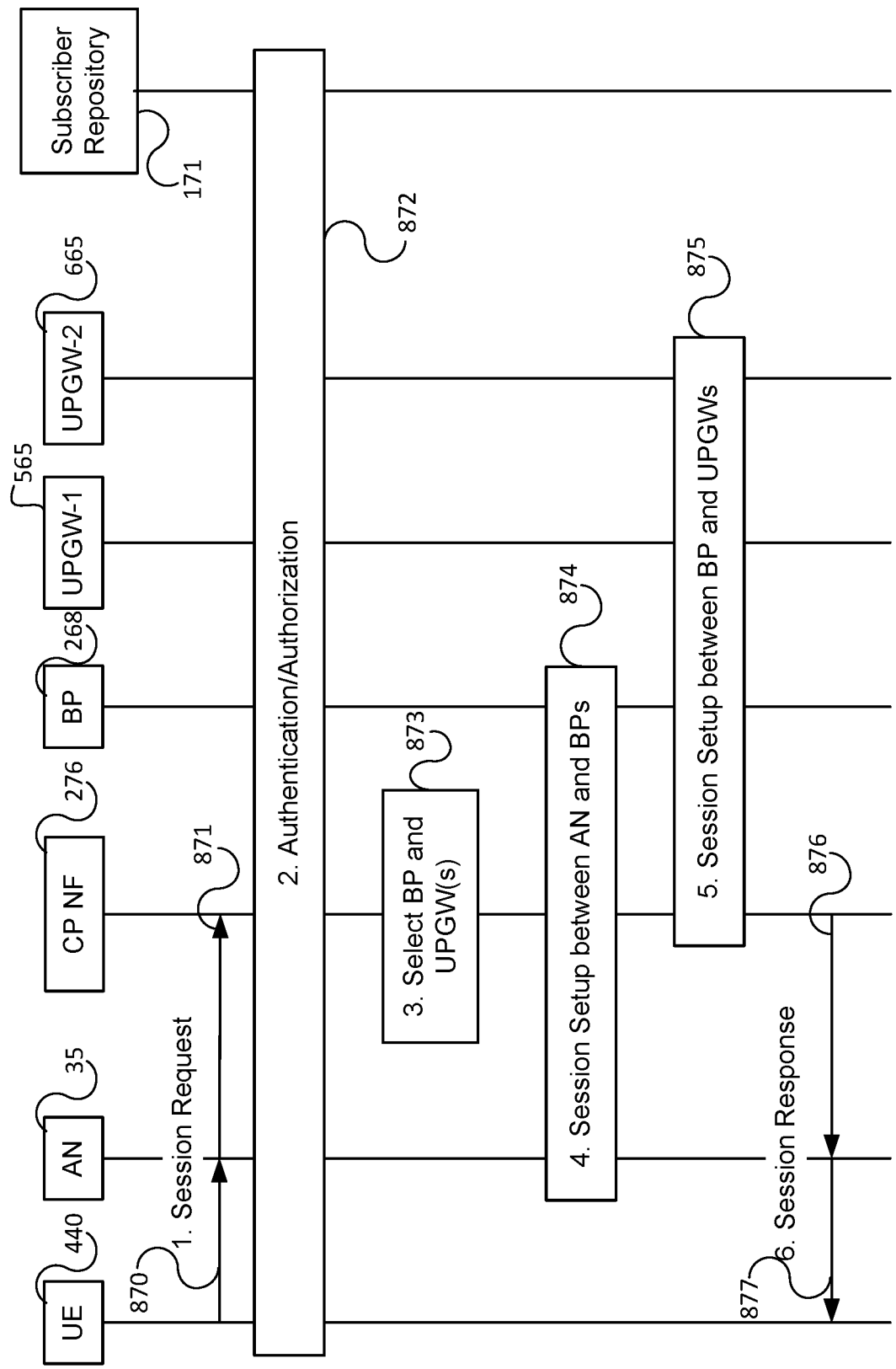
FIG. 20 illustrates an example of a session request procedure, according to an embodiment.

An example of a session request procedure is illustrated in FIG. 20, according to an embodiment. Such a procedure can be utilized both for initial set up for a multi-homed PDU session, but also for changes, such as when a UE 440 has an ongoing PDU session using UPGW-1 565 and makes a request for a new path of the PDU session which requires a new UPGW (UPGW-2 665) and, as a result, a new BP 268 may be selected. Additionally, this also applies to the case where the UE 440 has no ongoing session and makes a request for a PDU session which requires a BP and multiple UPGWs to meet the session performance requirements.

As illustrated in FIG. 20, at step 1 the UE 440 sends a Session Request to the Control Plane Network Function (CP NF 276) via the AN. The session request signalling is comprised of UE 440 sending a Session Request 870 to AN 35, which in turn sends Session Request 871 to CP NF 276. The request may include QoS requirements such as latency and bandwidth requirements, and in some cases reliability. At Step 2, the CP NF 276 initiates the authentication/authorization procedure 872 by checking with the subscriber repository 171. A Policy related procedure may be involved in this step. If the authentication/authorization in step 2 is successful, the CP NF 276 may select one or more UPGWs for the UE 440 at step 3. The UPGWs are selected to satisfy the latency and other performance requirements. The CP NF 276 may also select a Branching Point (BP 268) to serve the UE 440 as part of step 3 (Select BP and UPGW(s) 873). In the case of URLLC, the selection of the BP 268 is made based on the ability to satisfy low latency and high reliability requirements. As such, the BP 268 is selected to be very close or co-located with the AN 35. Additionally, BP 268 should have sufficient capability to implement mechanisms such as packet duplication, removing duplicate packets and NAT with low latency when supporting URLLC. The BP 268 may be configured with criteria for forwarding packets (e.g. based on IP-5-tuple, packet duplication when supporting a multi-path transport protocol). In order to satisfy the ultra-reliability requirement, the CP NF 276 (e.g. SM) may take into account information such as the probability of link and node failure as well as current and/or statistical loading and congestion information. At step 4 (Session Setup between AN and BPs 874) the CP NF 276 establishes the UP paths between the serving AN 35 and the selected BP 268. At step 5 (Session Setup between BP and UPGWs 875) the CP NF 276 establishes the UP paths between the BP 268 and the UPGWs 565 and 665. At step 6 the CP NF sends Session Response 876 to the serving AN node. The serving AN node forward the response 877 to the UE.

After the session is setup, if the UE 440 is assigned multiple IP addresses, the packet forwarding decision can be made by the UE 440. The UE 440 may select a source address for each UL packet. The AN node 35 forwards the UL packets to the BP 268, which then forwards the packets to the appropriate UPGW 565 or 665.

Alternatively, the UE 440 can select one address and the branching function may use other criteria for forwarding the packets to the different UPGWs.

Figure 21:
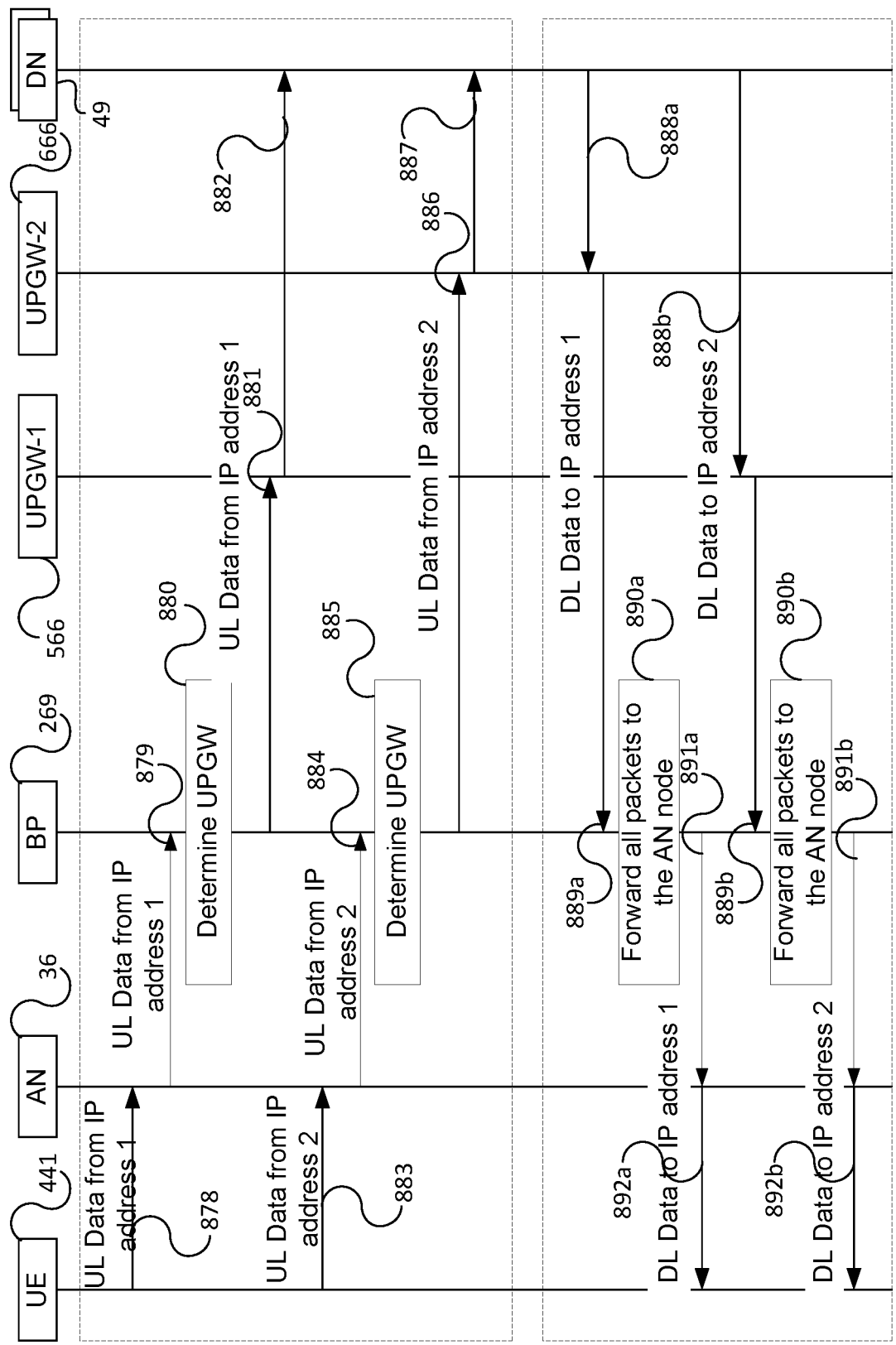
FIG. 21 illustrates an example of Data transmission using a branching function when UE selects the IP address, according to an embodiment.

An example of UL and DL data transmission using the BP for a multi-homing PDU session when the UE selects the source IP address is illustrated in the FIG. 21. When the UE 441 moves toward the coverage area of other AN nodes that are connected to a different UPGW, the CP NF may select another BP 269 and/or UPGW and setup the UP path between the AN and the new BP (if selected). If the UE moves out of coverage of the AN nodes that are associated with a given BP/UPGW then the corresponding paths can be removed. It should be appreciated that the UL signalling of this multi-homing PDU session is comprised of two different scenarios. In the first scenario, data packets forwarded by UE 441 to AN 36 have source IP addresses 1 and are signalled via UL Data 878 from IP address 1. AN 36 then forwards this packet to BP 269 via UL Data 879 from IP address 1. BP 269 then forwards this packet to UPGW-1 566 via UL Data 881 from IP address 1. UPGW-1 566 then forwards UL data 882 to the appropriate DN 49. In the second scenario, data packets forwarded by UE 441 to AN 36 have source IP addresses 2 and are signalled via UL Data 883 from IP address 2. AN 36 then forwards UL data 884 to BP 269 via UL Data from IP address 2. BP 269 then forwards this packet to UPGW-2 666 via UL Data 886 from IP address 2. UPGW-2 666 then forwards UL data 887 to the appropriate DN 49. It should also be appreciated FIG. 21 covers two scenarios for the DL signalling of a multi-homing PDU session. In the first scenario, DL data 888a forwarded by a DN to UPGW-2 666 have destination IP addresses 1. UPGW-2 666 then forwards this DL data 889a to BP 269. At step 890a BP 269 then forwards DL data 891a to AN nodes 36. AN 36 then forwards DL data 892a to the UE 441 addressed by IP address 1. In the second scenario, DL data 888b are forwarded by a DN to UPGW-1 566 have destination IP addresses 2. UPGW-1 566 then forwards DL data 889b to BP 269 for DL Data from IP address 2. At step 890b BP 269 then forwards DL data 891b to AN nodes 36. AN 36 then forwards this DL data 892b to the UE 441 for packets addressed by IP address 2.

The selection of the BP and UPGW and the BP to UPGW path establishment are done based on the PDU session requirements during Determine UPGW step 880 and Determine UPGW step 885 in FIG. 21. For example, to satisfy low latency requirements, the BPs along with the UPGWs, can be co-located with the AN such that the AS, which may also be located in a local DN, can be accessed with minimal RTT.

Figure 22:
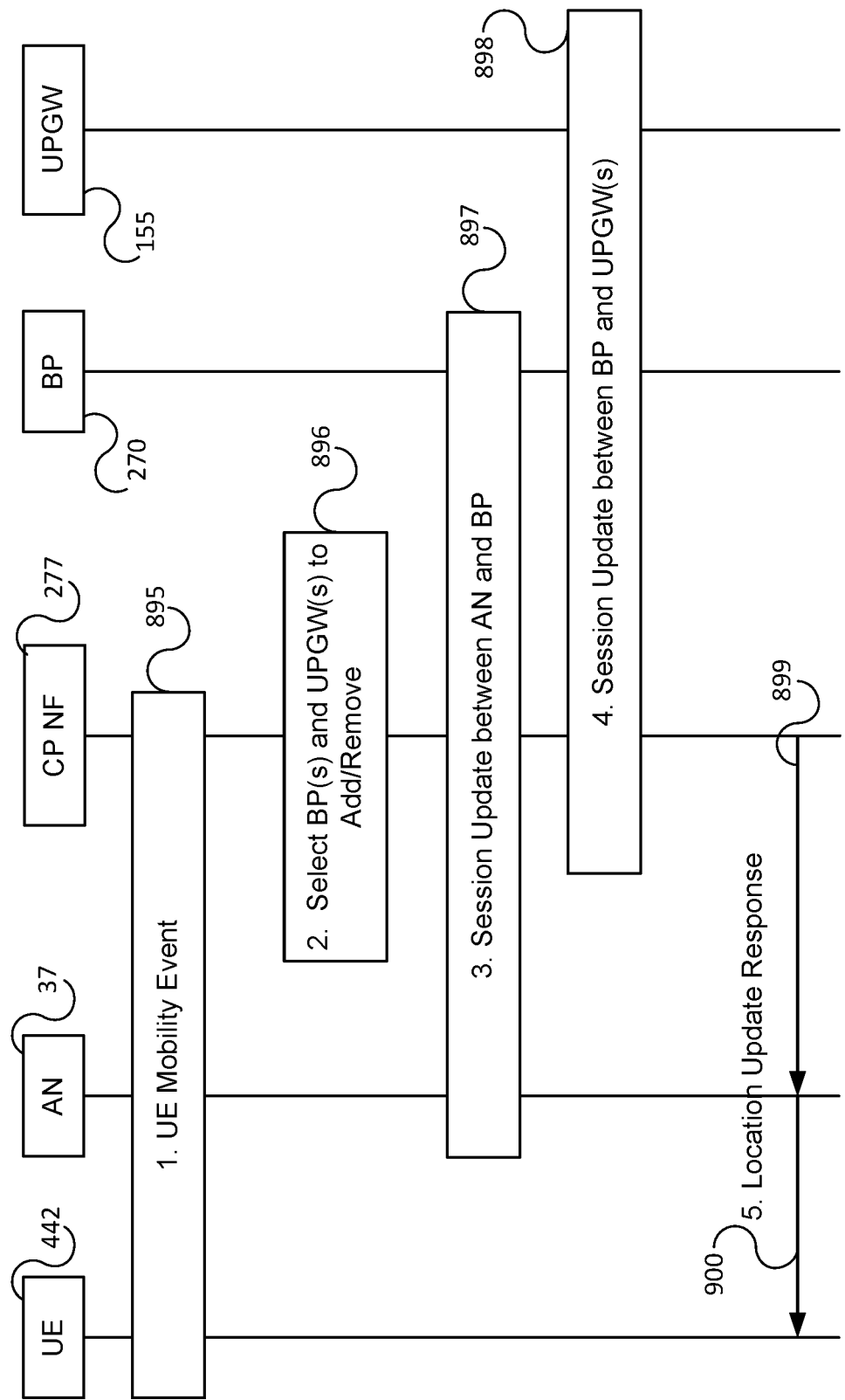
FIG. 22 illustrates an example session update procedure, according to an embodiment.

An example session update procedure is illustrated in FIG. 22, according to an embodiment. Such a procedure can involve the BP 270 and UPGW 155 relocation, for example during UE 442 mobility. At step 1 (UE Mobility Event 895) a UE location update or location tracking procedure is performed. This procedure involves the UE 442, the AN nodes 37 and the CP NF 277. If a mobility event occurs, then at step 2 (Select BP(s) and UPGW(s) to Add/Remove 896) the CP NF 277 determines if a BP 270 and/or UPGW 155 should be added or removed for the UE 442 based on the UE 442 mobility. At step 3 (Session Update between AN and BP 897) the CP NF 277 updates the session between the AN 37 and the BP 270. If a new BP is added, a new path is established. Otherwise, it terminates a path if a BP is removed for the UE 442. At step 4 (Session Update between BP and UPGW(s) 898) the CP NF 277 updates the session between the BP 270 and the UPGWs. At step 5 the CP NF sends a location update response or location tracking response to the UE. If a new UPGW is selected or removed, the CP NF sends the updated addresses/prefixes to the UE. Updates to UE 442's address/prefixes are accomplished by CP NF 277 sending Location Update Response 899 to AN 37 which in turn sends Location Update Response 900 to UE 442.

Various embodiments for session continuity have been discussed above. For each, high reliability can be achieved using well-known link redundancy techniques such as SCTP and MPTCP. Network based reliability using parallel link and IP management is illustrated in the end-to-end protocol stack in the FIG. 23.

Figure 23:
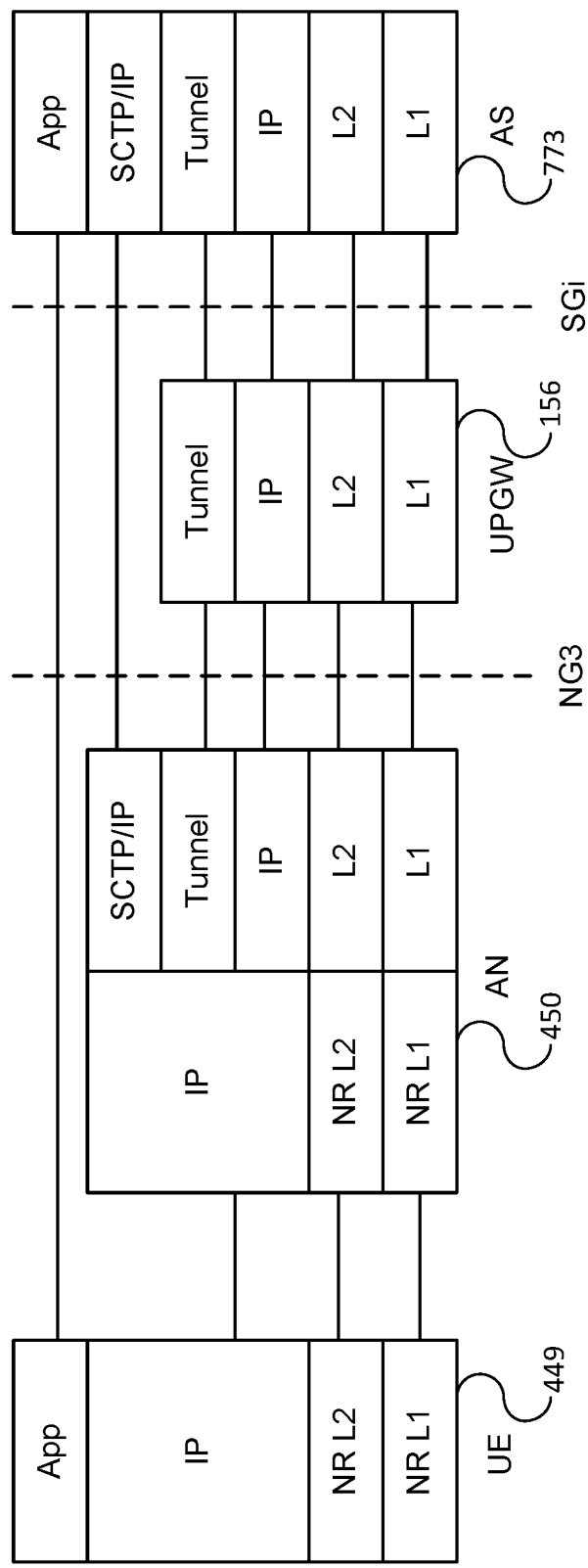
FIG. 23 illustrates an end to end protocol stack for network based ultra-reliable transmission, according to an embodiment.

FIG. 23 illustrates an example end-to-end protocol stack for network based ultra-reliable transmission according to an embodiment. In this example, SCTP is used to send duplicate packets on different paths and to remove the duplicates before the packets are forwarded to the application. The tunneling protocol used by NextGen can be combined with the SCTP protocol.

Ultra-high reliability is required for a number of use cases. In some of the use cases, ultra low latency is also required. For ultra-reliable low latency communication (URLLC), the UPGWs, which provide mobility and IP anchoring, should be close to the UE. In this case, the AS should be close to the RAN in order to allow applications to run closer to the edge. The UPGW or BP can be collocated with the AN or close enough to the AN to satisfy the RTT.

For use cases requiring high throughput with high reliability, some embodiments utilize multiple paths to the AS in order to enable parallel packet transmission and reception. In addition to providing load sharing capability, multiple paths can ensure end-to-end redundancy in the case where any one of the paths fails.

Although using a local UPGW connected to a local network for URLLC can reduce the end-to-end latency, some embodiments utilize multiple UPGWs close to the RAN access nodes in order to meet the ultra reliability requirement in high mobility scenarios and/or in ultra-dense network deployments.

In order to ensure the ultra high reliability requirement for some use cases, the UE may be connected to multiple AN nodes or may connected to a single AN node with multiple carriers. The UE sends redundant packets on the multiple links to ensure that the reliability requirement is satisfied. Before the data is sent to the core, in some embodiments the AN may remove the duplicate packets. In this case, the core network should duplicate the packets to ensure the reliability in the core network. The packet duplication and the removal of the duplicate packets can be performed at the Branching Point (BP) and the AS as illustrated in the FIGS. 24 and 25 which consider two scenarios. The BP duplicates the UL packets and sends the duplicates to the UPGWs. The AS removes the duplicate packets received from the multiple UPGWs. For DL transmission, the AS duplicates the packets and sends them to the multiple UPGWs. The UPGWs forward the packets to the BP, which then removes the duplicate packets. The duplicate packets are detected by adding a sequence number to the packet header. The CN node that duplicates the packets is responsible for adding the header containing the sequence number. The receiving node is responsible for forwarding one packet to the AN node and dropping the duplicates.

Figure 24A:
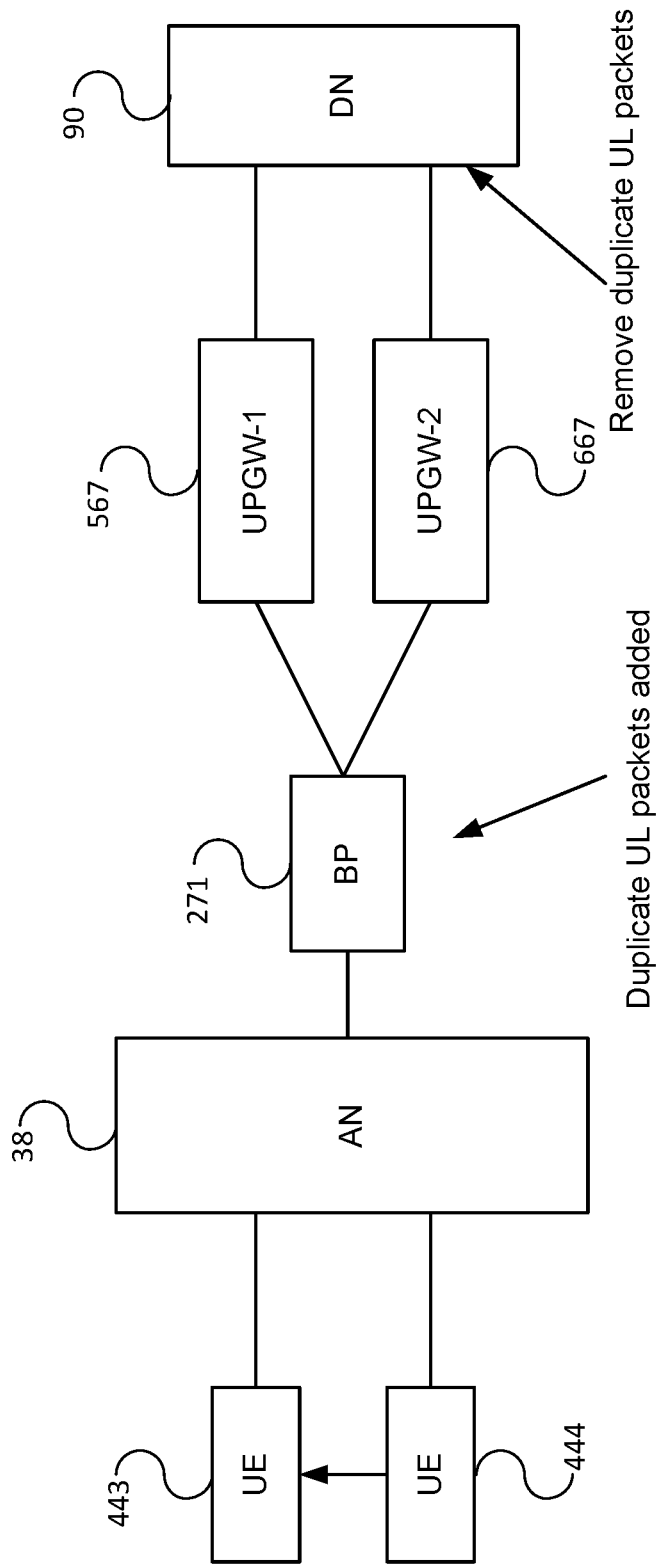
FIGS. 24A and 24B illustrates Packet duplication and removal of duplicate packets in the Remote DN scenario, according to an embodiment.
Figure 24B:
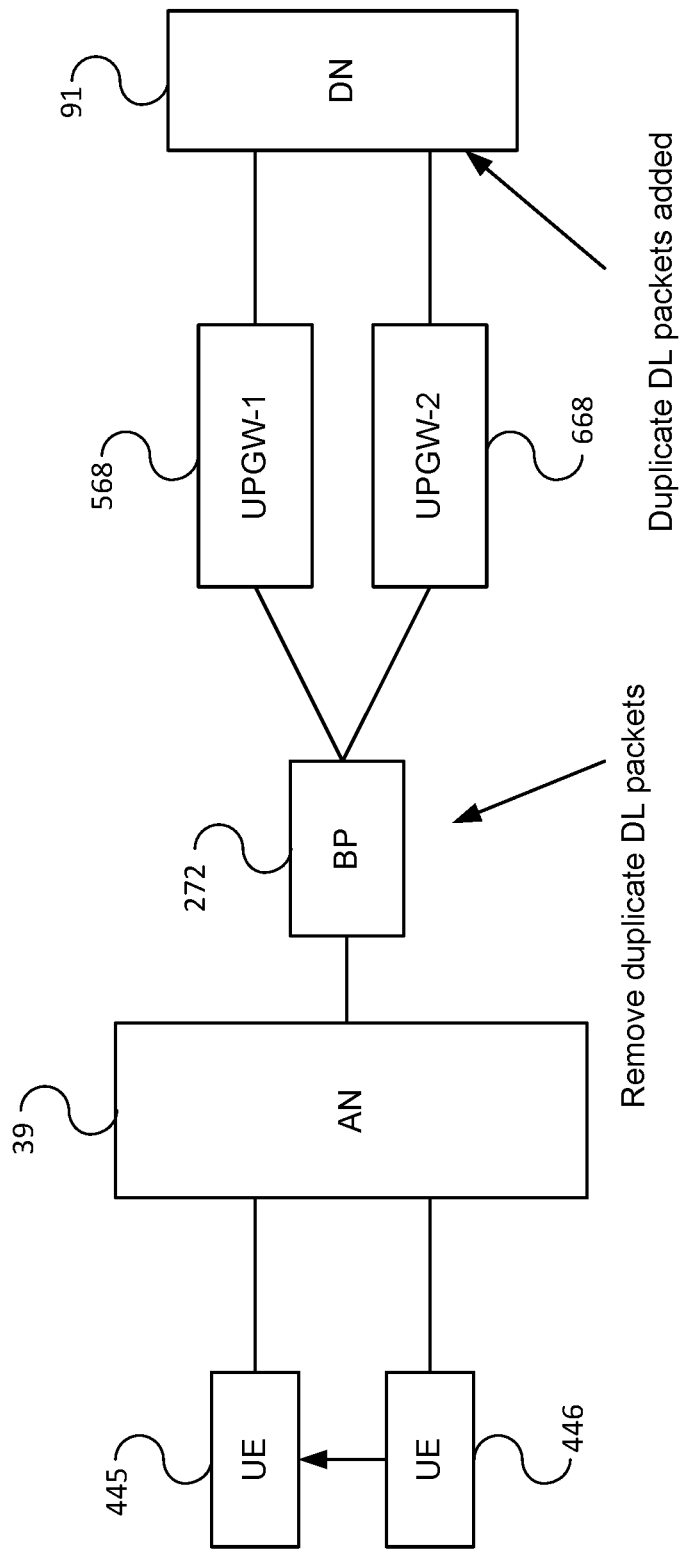

FIG. 24A illustrates packet duplication and removal of duplicate packets according to a remote DN scenario, according to an embodiment. In such a remote DN scenario, Data is sent to the remote DN 90 using multiple UPGWs (UPGW-1 567 and UPGW-2 667) via AN 38. FIG. 24A shows the BP 271 adding duplicate UL packets for redundancy and the DN 90 removing the duplicate UL packets. The UE can be in position 443 or 444. FIG. 24B shows the DN 91 adding duplicate DL packets and the BP 272 removing duplicate packets received from UPGW-1 568 and UPGW-2 668 before forwarding to the AN 39. The UE can be in position 446 or 445. It should be appreciated that while a single AN is shown for brevity, it should be appreciated that the UE can be served by a serving cluster of ANs as per the above discussion.

Figure 25:
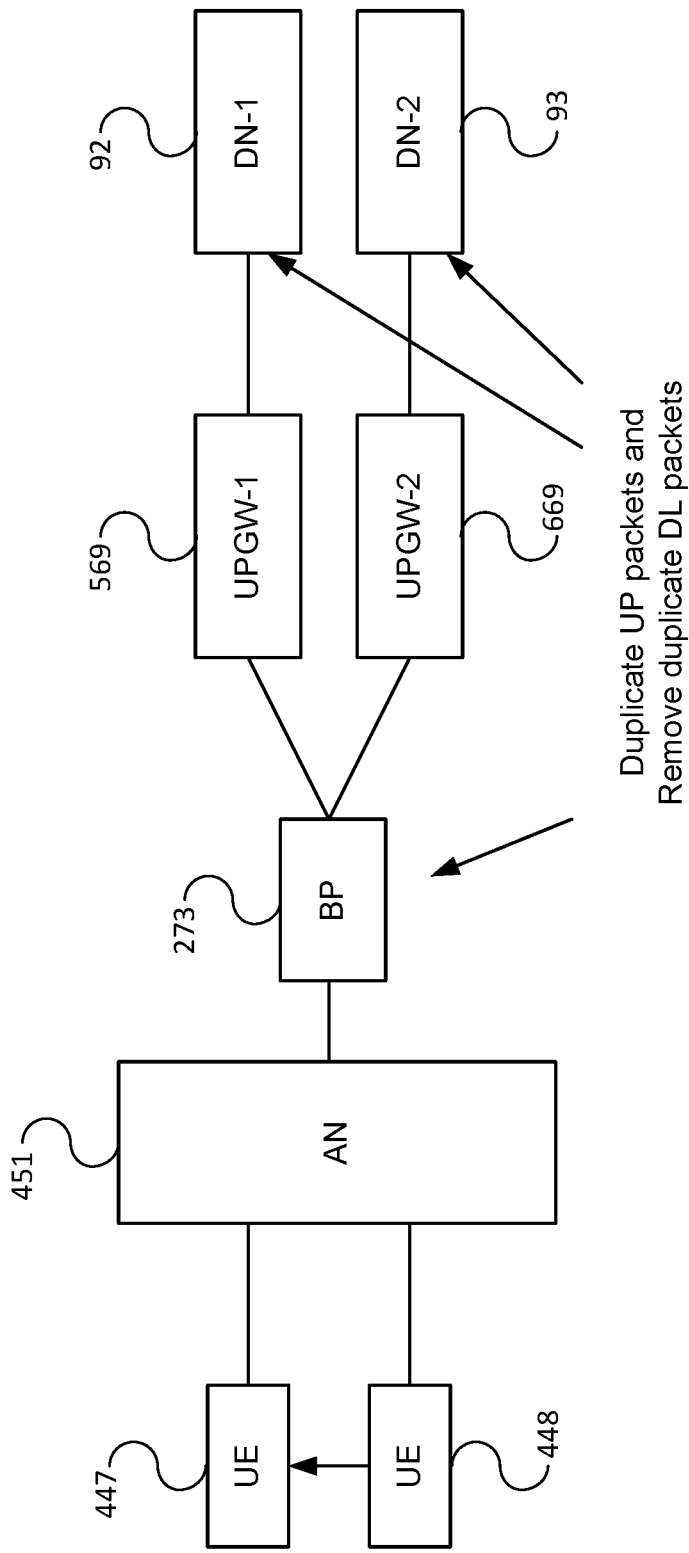
FIG. 25 illustrates Packet duplication and removal of duplicate packets in the local breakout scenario, according to an embodiment.

FIG. 25 illustrates Packet duplication and removal of duplicate packets according to a local breakout scenario, according to an embodiment. In such a Local breakout scenario, Data is sent to multiple breakout paths to local networks (DN-1 92 and DN-2 93) via (UPGW-1 569 and UPGW-2 669). The BP 273 duplicates the packets received from the AN 451 which are received from the UE, which can be in position 447 or 448. In some embodiments, There can be multiple UPGWs for each local DN. Once again, it should be appreciated that while a single AN is shown for brevity, it should be appreciated that the UE can be served by a serving cluster of ANs as per the above discussion. In some embodiments there can be multiple ANs but only a single UPGW. In which case, in the UL the BP can remove duplicate packets before forwarding the packets to the DN. In this case in the DL, the BP can forward the packets to the multiple ANs.

To minimize the latency, the BP can be close to or co-located with the AN node.

A function can be included in the BP to perform either network trunking or packet redundancy. The function can be configured to send packets through multiple UPGWs, which may be associated with one or more DNs. In the network trunking mode, the packets are distributed/combined over multiple paths to/from one or more DNs.

An example call flow for the packet redundancy mode is illustrated in the following FIG. 26, according to an embodiment. A similar procedure is used for network trunking.

In some embodiments a session management procedure selects appropriate UPGWs and the number of UPGWs to satisfy the performance requirements for the session request.

In the Remote DN scenario, the BP node 274 forwards the UL packets to the multiple UPGWs selected for the UE. The AS removes the duplicate packets. It should be appreciated that in the UL direction, shown in FIG. 26, where Duplicate packets and send to multiple UPGWs step 901 occurs when BP 274 sends UL data 902 to UPGW-1 570 and BP 274 sends UL Data 903 to UPGW-2 670. UPGW-1 570 then forwards UL Data 904 to AS 770. UPGW-2 670 also forwards UL Data 905 to AS 770. AS 770 then removes duplicate packets at step 906. For DL packets, the AS can be configured to send duplicate packets to the UPGWs assigned to the UE. The duplicated packets are removed at the BP. This is shown in FIG. 26 at step 907 where AS 770 duplicates packets and sends to multiple AN nodes. AS 770 forwards this duplicated DL Data to UPGW-1 570 via DL Data 908. AS 770 forwards duplicated DL data to UPGW-2 670 via DL Data 909. UPGW-1 570 then forwards DL Data to BP 274 via DL Data 911. UPGW-2 670 forwards DL Data to BP 274 via DL Data 910. BP 274 then removes duplicate packets at step 912.

Figure 26:
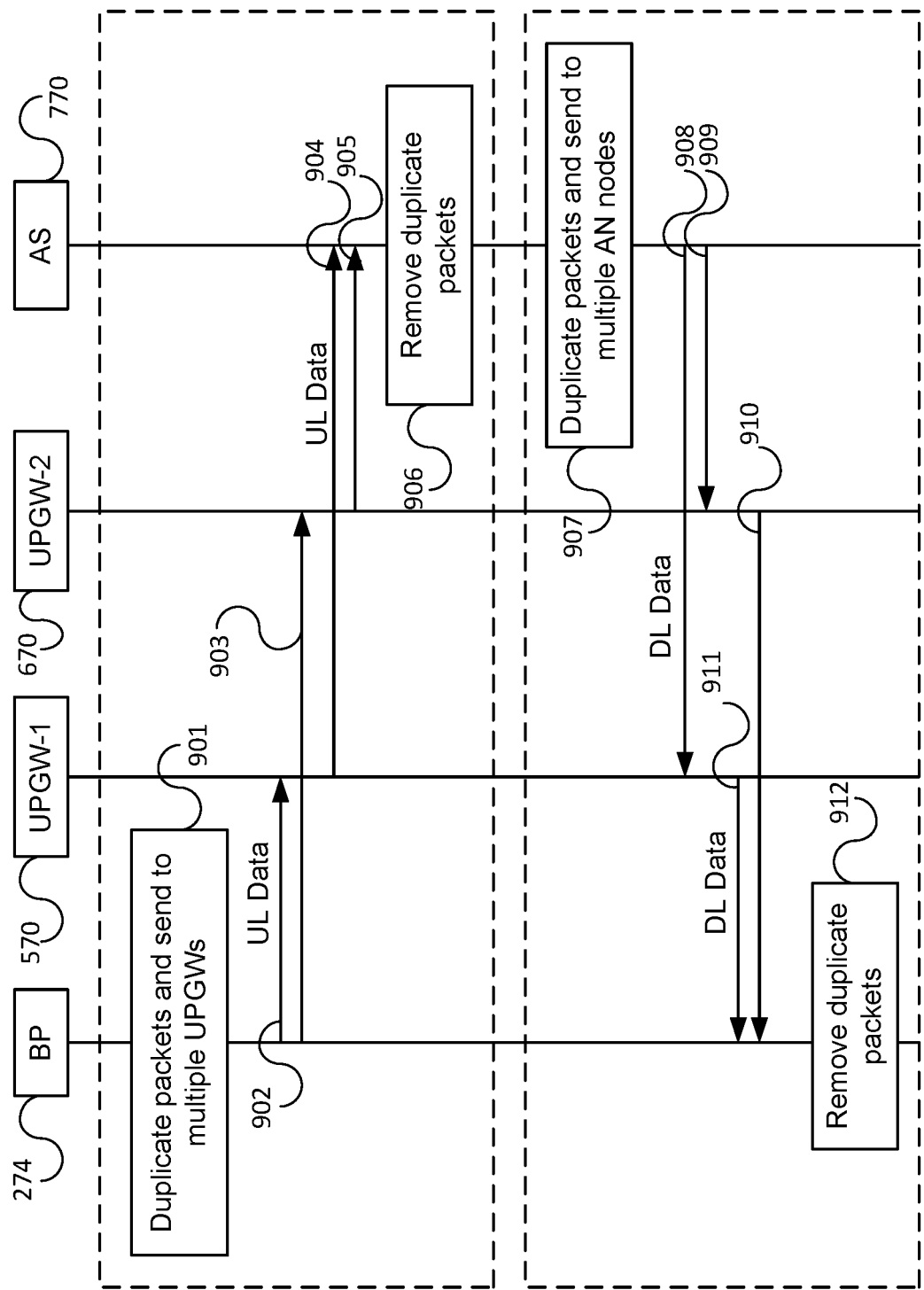
FIG. 26 illustrates Packet duplication and removal call flow, according to an embodiment.
Figure 27:
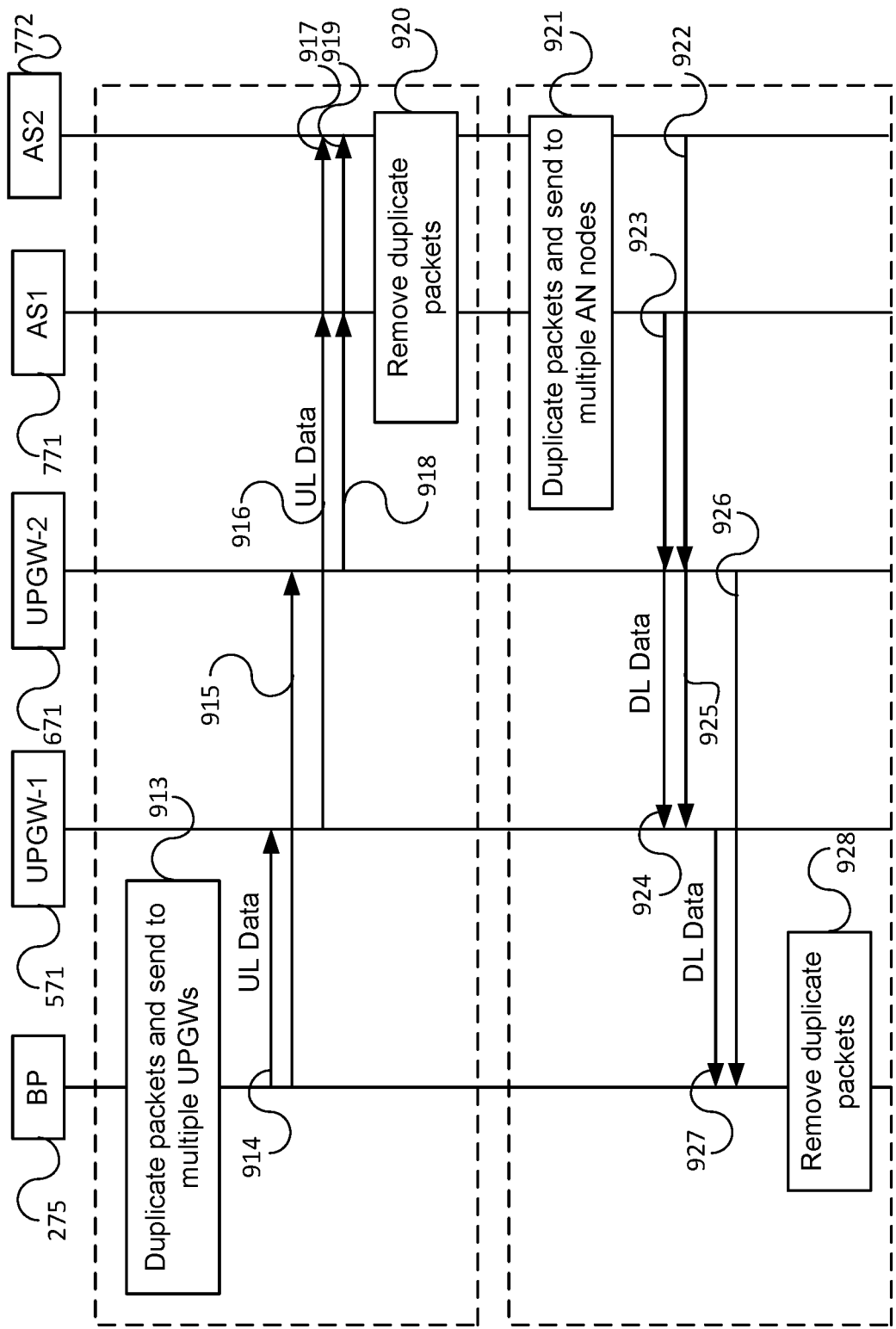
FIG. 27 is similar to FIG. 26 for a Local Breakout scenario, according to an embodiment.

FIG. 27 is similar to FIG. 26 for a Local Breakout scenario, according to an embodiment. In the Local Breakout scenario, the UE is assigned a primary destination address corresponding to the AS in the primary local network. The BP node 275 can send the UL packets to multiple UPGWs corresponding to the same primary local network as well as to UPGWs corresponding to the secondary local network. For the UL packets routed toward the AS (771 or 772), the same procedure described in the Remote DN scenario is used. In the UL direction, shown in FIG. 27, Duplicate packets and send to multiple UPGWs step 913 occurs when BP 275 sends UL data 914 to UPGW-1 571 and BP 275 sends UL Data 915 to UPGW-2 671. UPGW-1 571 then forwards UL Data 916 to AS1 771 and UL Data 917 to AS2 772. UPGW-2 671 forwards UL Data 918 to AS1 918 and UL Data 919 to AS2 772. AS1 771 and AS2 772 then removes duplicate packets at step 920. For DL packets, both ASs in the primary and secondary local networks use the addresses that are specified by the SM. This is shown in FIG. 27 where AS1 771 and AS2 772 Duplicate packets and send to multiple AN nodes at step 921. AS1 771 forwards this duplicated DL Data to UPGW-2 671 via DL Data 923 and to UPGW-1 571 via DL Data 924. AS2 772 forwards duplicated DL data to UPGW-2 671 via DL Data 922 and to UPGW-1 571 via DL Data 925. UPGW-1 571 then forwards DL Data to BP 275 via DL Data 927. UPGW-2 671 forwards DL Data 926 to BP 274. BP 275 then removes duplicate packets at step 928.

When the UE moves toward the coverage area of other AN nodes that are connected to a different UPGWs, the SM NF should update the PDU session.

Figure 28:
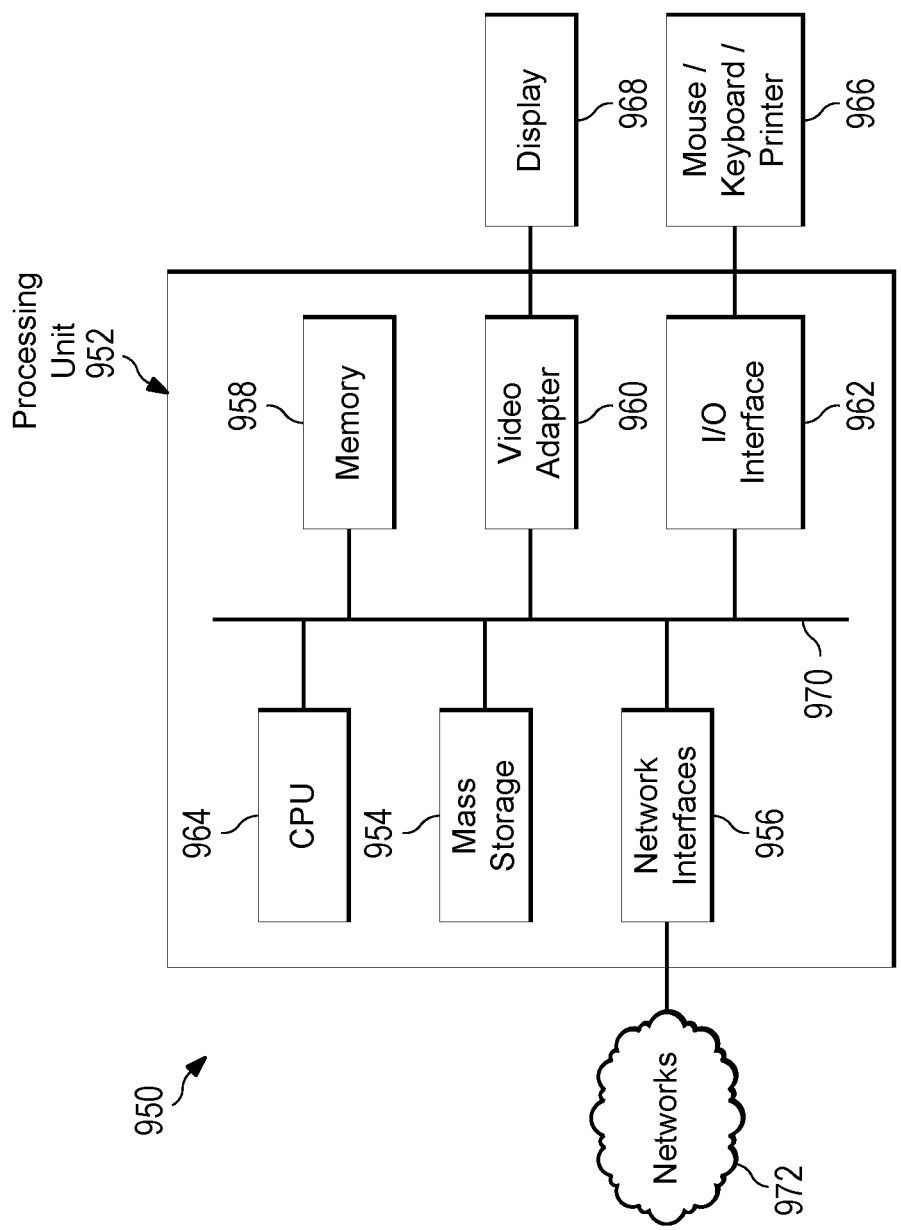
FIG. 28 illustrates a processing system according to an embodiment.

FIG. 28 is a block diagram of a computing system 950 that may be used for implementing the devices and methods disclosed herein, For example, the computing system can be any entity of UE, AN, MM, SM, UPGW, AS, BP, the CP NF or other entity shown in FIGS. 1-27. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 950 includes a processing unit 952. The processing unit includes a central processing unit (CPU) 964, memory 958, and may further include a mass storage device 954, a video adapter 960, and an I/O interface 962 connected to a bus 970.

The bus 970 may be one or more of any type of several bus architectures including a memory bus or memory controller, a peripheral bus, or a video bus. The CPU 964 may comprise any type of electronic data processor. The memory 958 may comprise any type of non-transitory system memory such as static random access memory (SRAM), dynamic random access memory (DRAM), synchronous DRAM (SDRAM), read-only memory (ROM), or a combination thereof. In an embodiment, the memory 958 may include ROM for use at boot-up, and DRAM for program and data storage for use while executing programs.

The mass storage 954 may comprise any type of non-transitory storage device configured to store data, programs, and other information and to make the data, programs, and other information accessible via the bus 970. The mass storage 954 may comprise, for example, one or more of a solid state drive, hard disk drive, a magnetic disk drive, or an optical disk drive.

The video adapter 960 and the I/O interface 962 provide interfaces to couple external input and output devices to the processing unit 952. As illustrated, examples of input and output devices include a display 968 coupled to the video adapter 960 and a mouse/keyboard/printer 966 coupled to the I/O interface 962. Other devices may be coupled to the processing unit 952, and additional or fewer interface cards may be utilized. For example, a serial interface such as Universal Serial Bus (USB) (not shown) may be used to provide an interface for an external device.

The processing unit 952 also includes one or more network interfaces 956, which may comprise wired links, such as an Ethernet cable, and/or wireless links to access nodes or different networks. The network interfaces 956 allow the processing unit 952 to communicate with remote units via the networks. For example, the network interfaces 956 may provide wireless communication via one or more transmitters/transmit antennas and one or more receivers/receive antennas. In an embodiment, the processing unit 952 is coupled to a local-area network 972 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a establishing unit/module for establishing a serving cluster, a instantiating unit/module, an establishing unit/module for establishing a session link, an maintaining unit/module, other performing unit/module for performing the step of the above step. The respective units/modules may be hardware, software, or a combination thereof. For instance, one or more of the units/modules may be an integrated circuit, such as field programmable gate arrays (FPGAs) or application-specific integrated circuits (ASICs).

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method of managing a session between a User Equipment (UE) and at least one data network, the method comprising:

receiving, by a session management (SM) network function from a mobility manager (MM) function associated with an access network (AN) node capable of serving the UE, a request to establish the session;

selecting, by the SM network function, multiple user plane gateways (UPGWs) for the UE after receiving the session request;

determining, by the SM network function, user plane (UP) paths between the AN node and the multiple UPGWs, wherein the UP paths support the session and wherein at least a first UPGW among the multiple UPGWs being associated with a first data network of the at least one data network; and selecting, by the SM network function, a user plane (UP) branching function, such that each of the UP paths comprises the UP branching function and at least one of the multiple UPGWs, with the branching function located between the AN node and the at least one data network, wherein the UP branching function is configured with filtering criteria for performing at least one of packet duplication, packet forwarding and packet merging.

2. The method of claim 1 wherein a second UPGW among the multiple UPGWs is associated with a second data network of the at least one data network.

3. The method of claim 1 further comprising:
receiving, by the SM network function, a session update message to update the session; and
modifying, by the SM network function, the session in response to the session update message.

4. The method of claim 3 wherein modifying comprises adding a new UPGW to the session.

5. The method of claim 4 wherein the method further comprises: selecting, by the SM network function, the new UPGW after receiving the session update message.

6. The method of claim 3 wherein modifying further comprises removing one of the multiple UPGWs from the session.

7. The method of claim 3 further comprising updating network address translation information in response to the modifying.

8. The method of claim 1 wherein the at least one data network includes a mobile edge computing server.

9. The method of claim 1 wherein a second UPGW among the multiple UPGWs is associated with an application server connected to the at least one data network.

10. The method of claim 1 wherein the SM network function selects the multiple UPGWs based on a location of the UE.

11. The method of claim 1 wherein the session is associated with ultra reliable low latency communication (URLLC).

12. The method of claim 11 wherein the SM network function selects the multiple UPGWs based on a policy associated with the URLLC.

13. An apparatus comprising a processor coupled with a non-transitory memory storing instructions which when executed by the processor control the processor to execute steps of:
receiving, from a mobility manager (MM) function associated with an access network (AN) node capable of serving a user equipment (UE), a request to establish a session between the UE and at least one data network;
selecting multiple user plane gateways (UPGWs) for the UE after receiving the session request;
determining user plane (UP) paths between the AN node and the multiple UPGWs, wherein the UP paths support the session; and
selecting a user plane (UP) branching function, such that each of the UP paths comprises the UP branching function and at least one of the multiple UPGWs, with the branching function located between the AN node and the at least data network, wherein the UP branching function is configured with filtering criteria for performing at least one of packet duplication, packet forwarding and packet merging.

14. A system of managing a session between a User Equipment (UE) and at least one data network, the system comprising:
at least one processor; and
a non-transitory machine readable memory storing instructions which when executed by the at least one processor configure:
a mobility manager (MM) function to: receive a request to establish the session from an access network (AN) node capable of serving the UE, and send the request to a session management (SM) network function; and
the SM network function to:
receive the request from the MM function;
select multiple user plane gateways (UPGWs) for the UE after receiving the session request;
determine user plane (UP) paths between the AN node and the multiple UPGWs, wherein the UP paths support the session; and
select a user plane (UP) branching function, such that each of the UP paths comprises the UP branching function and at least one of the multiple UPGWs, with the branching function located between the AN node and the at least one data network, wherein the UP branching function is configured with filtering criteria for performing at least one of packet duplication, packet forwarding and packet merging.

15. The system of claim 14 wherein the UP branching function is configured to:
receive data packets associated with the session;
forward the data packets to a first UPGW of the multiple UPGWs;
duplicate the data packets; and
forward the duplicated data packets to a second UPGW of the multiple UPGWs.

16. The system of claim 14 the UP branching function is further configured to:
receive packets from a first UPGW of the multiple UPGWs;
receive packets from a second UPGW of the multiple UPGWs;
merge the packets; and
forward the packets towards the UE.

* * * * *